US008897999B2

(12) United States Patent  
Takeuchi et al.

(10) Patent No.: US 8,897,999 B2  
(45) Date of Patent: Nov. 25, 2014

(54) SECTION SETTING METHOD, MILEAGE INFORMATION GENERATION DEVICE, AND OPERATION ASSIST DEVICE

(75) Inventors: Shojiro Takeuchi, Tokyo (JP); Hiroki Nakashima, Kawasaki (JP); Satomi Yoshioka, Yokohama (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 0 days.

(21) Appl. No.: 13/820,896

(22) PCT Filed: Sep. 21, 2011

(86) PCT No.: PCT/JP2011/071417  
§ 371 (c)(1),  
(2), (4) Date: Mar. 5, 2013

(87) PCT Pub. No.: WO2012/039405  
PCT Pub. Date: Mar. 29, 2012

(65) Prior Publication Data  
US 2013/0173147 A1 Jul. 4, 2013

(30) Foreign Application Priority Data

Sep. 22, 2010 (JP) ................. 2010-212352

(51) Int. Cl.  
*G08G 1/123* (2006.01)  
*G01C 21/34* (2006.01)  
*G06F 17/00* (2006.01)  
*G01C 21/32* (2006.01)

(52) U.S. Cl.  
CPC ............ *G06F 17/00* (2013.01); *G01C 21/3469* (2013.01); *G01C 21/32* (2013.01)  
USPC ........... 701/123; 701/410; 701/411; 701/533; 340/988; 340/990; 340/995.15; 340/995.22

(58) Field of Classification Search  
USPC ......... 701/1, 23, 24, 115, 123, 410, 411, 423, 701/424, 425, 533; 340/438, 439, 995.19, 340/995.22, 995.23, 995.26, 995.27, 340/995.28, 988; 455/414.4, 456.1  
See application file for complete search history.

(56) References Cited

U.S. PATENT DOCUMENTS 5,742,922 A * 4/1998 Kim .............................. 701/423  
6,005,494 A * 12/1999 Schramm ................. 340/995.19  
6,151,549 A * 11/2000 Andrews et al. .............. 701/115  
(Continued)

FOREIGN PATENT DOCUMENTS

JP  A-2006-78326  3/2006  
JP  A-2009-31046  2/2009  
(Continued)

*Primary Examiner* — Thomas Tarcza  
*Assistant Examiner* — Tyler J Lee  
(74) *Attorney, Agent, or Firm* — Oliff PLC

(57) ABSTRACT

A section setting method calculates information relating to an attainable actual fuel efficiency under a vehicle operation performed in consideration of fuel efficiency. To that end, the section setting method collects fuel-efficiency information that is information relating to the fuel efficiency required for a movement from a start point to a destination point of the vehicle, which is obtained under a plurality of kinds of vehicle operations, along with positional information of the vehicle at each time. The section setting method compares change pattern parts of the collected fuel-efficiency information with each other, thereby sequentially connecting the change pattern parts of the fuel-efficiency information from the start point to the destination point. The section setting method sets, as a section used to calculate the actual fuel efficiency, a section obtained by sectioning at points corresponding to the connection points of the change pattern parts connected.

17 Claims, 15 Drawing Sheets

(56) References Cited

U.S. PATENT DOCUMENTS

| | | | |
|---|---|---|---|
| 6,594,579 B1 * | 7/2003 | Lowrey et al. | 701/123 |
| 6,988,033 B1 * | 1/2006 | Lowrey et al. | 701/123 |
| 7,512,486 B2 * | 3/2009 | Needham et al. | 701/414 |
| 7,783,417 B2 * | 8/2010 | Vavrus | 701/423 |
| 8,175,795 B2 * | 5/2012 | Narita et al. | 701/410 |
| 2007/0005237 A1 * | 1/2007 | Needham et al. | 701/202 |
| 2009/0082952 A1 | 3/2009 | Narita et al. | |
| 2012/0089327 A1 * | 4/2012 | Miura et al. | 701/411 |
| 2013/0054125 A1 * | 2/2013 | Bruemmer et al. | 701/123 |

FOREIGN PATENT DOCUMENTS

| | | |
|---|---|---|
| JP | A-2009-79995 | 4/2009 |
| JP | A-2009-250930 | 10/2009 |

* cited by examiner

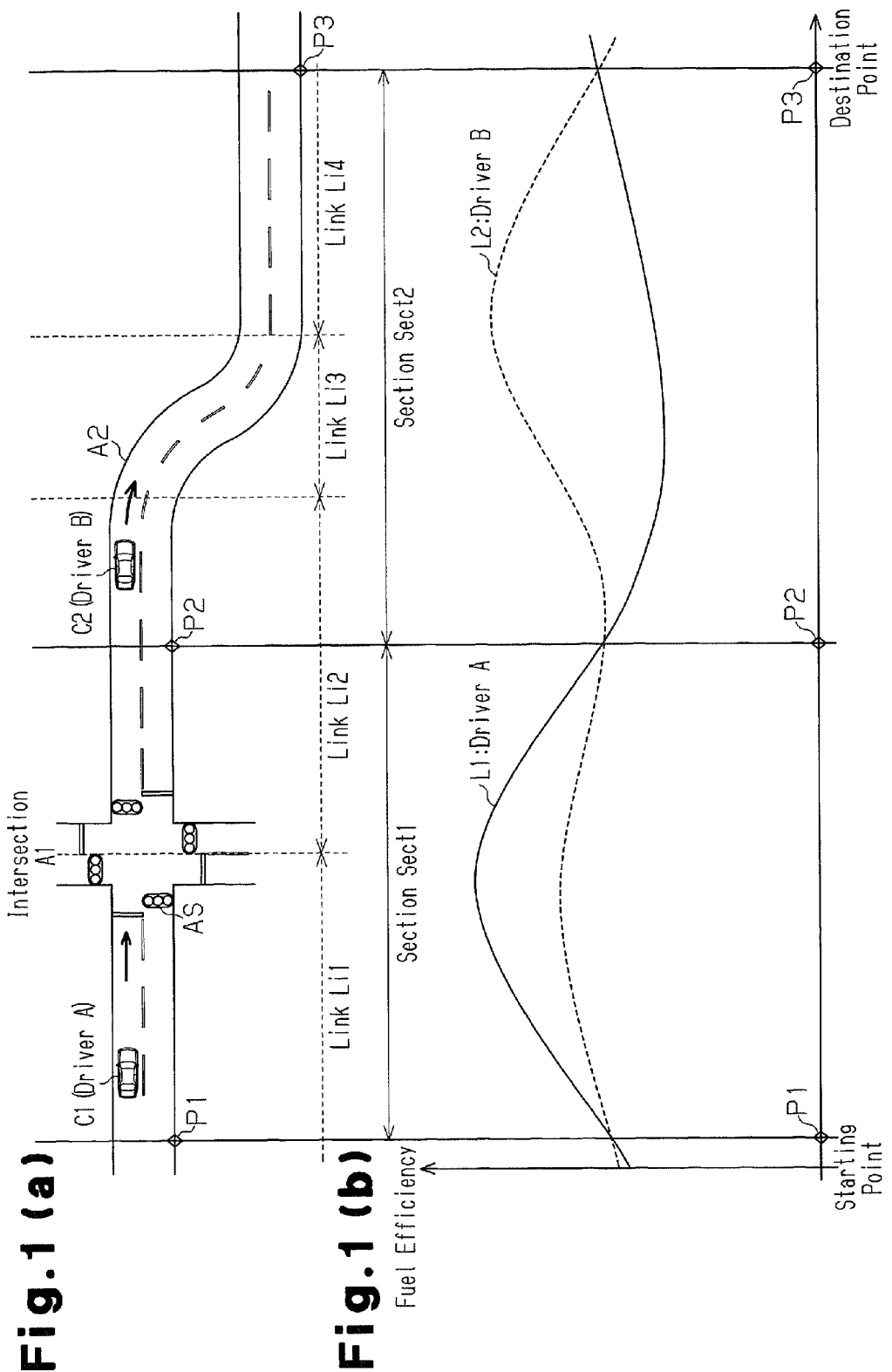

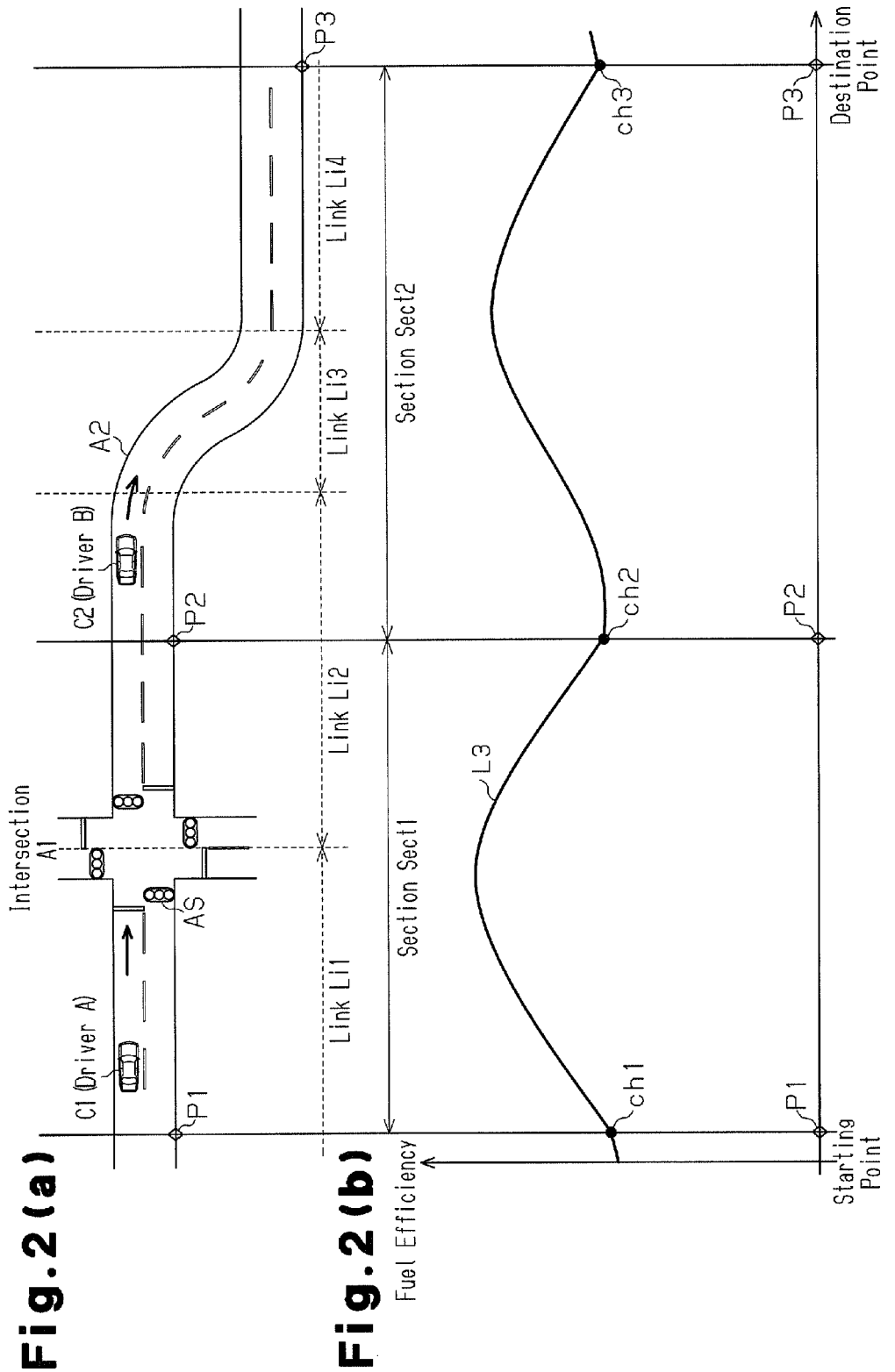

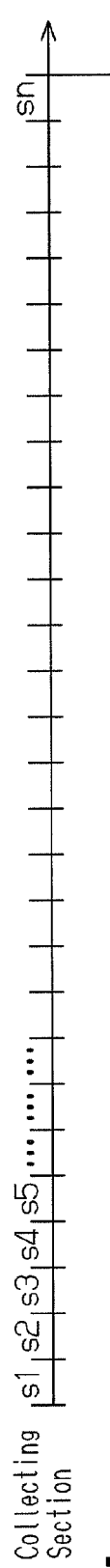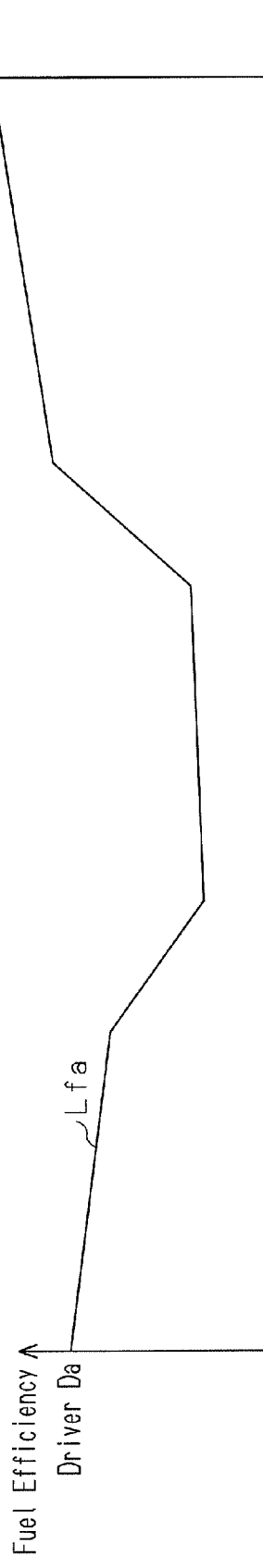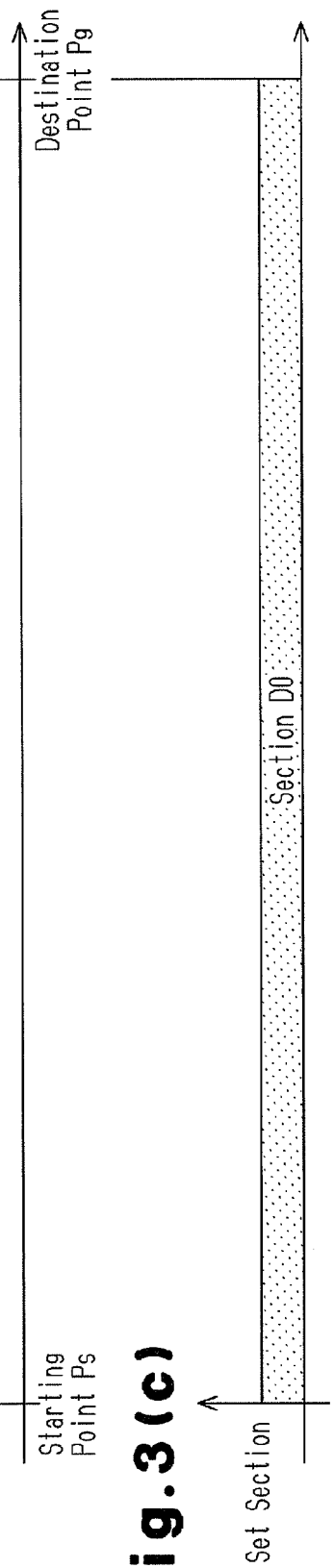

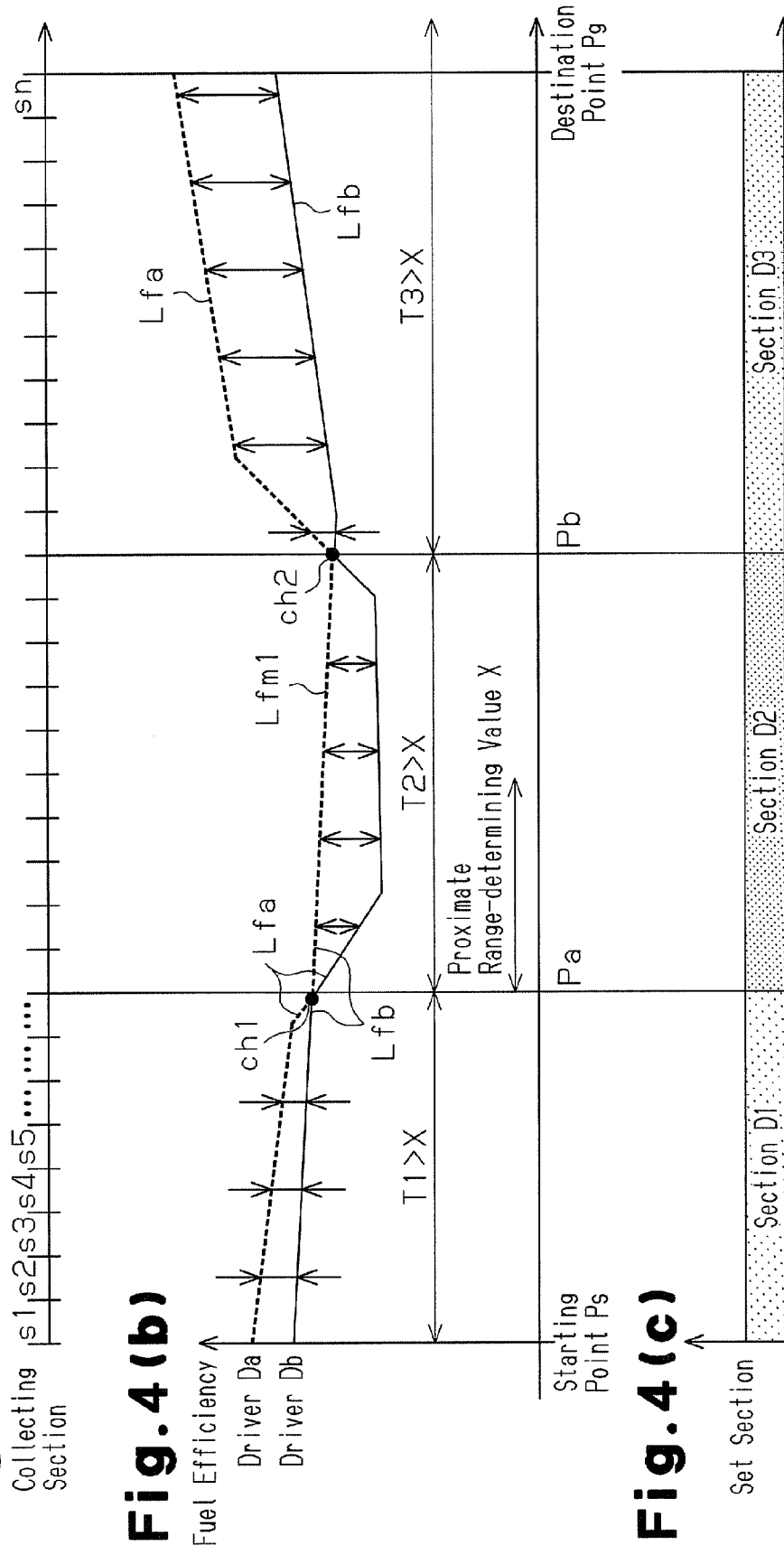

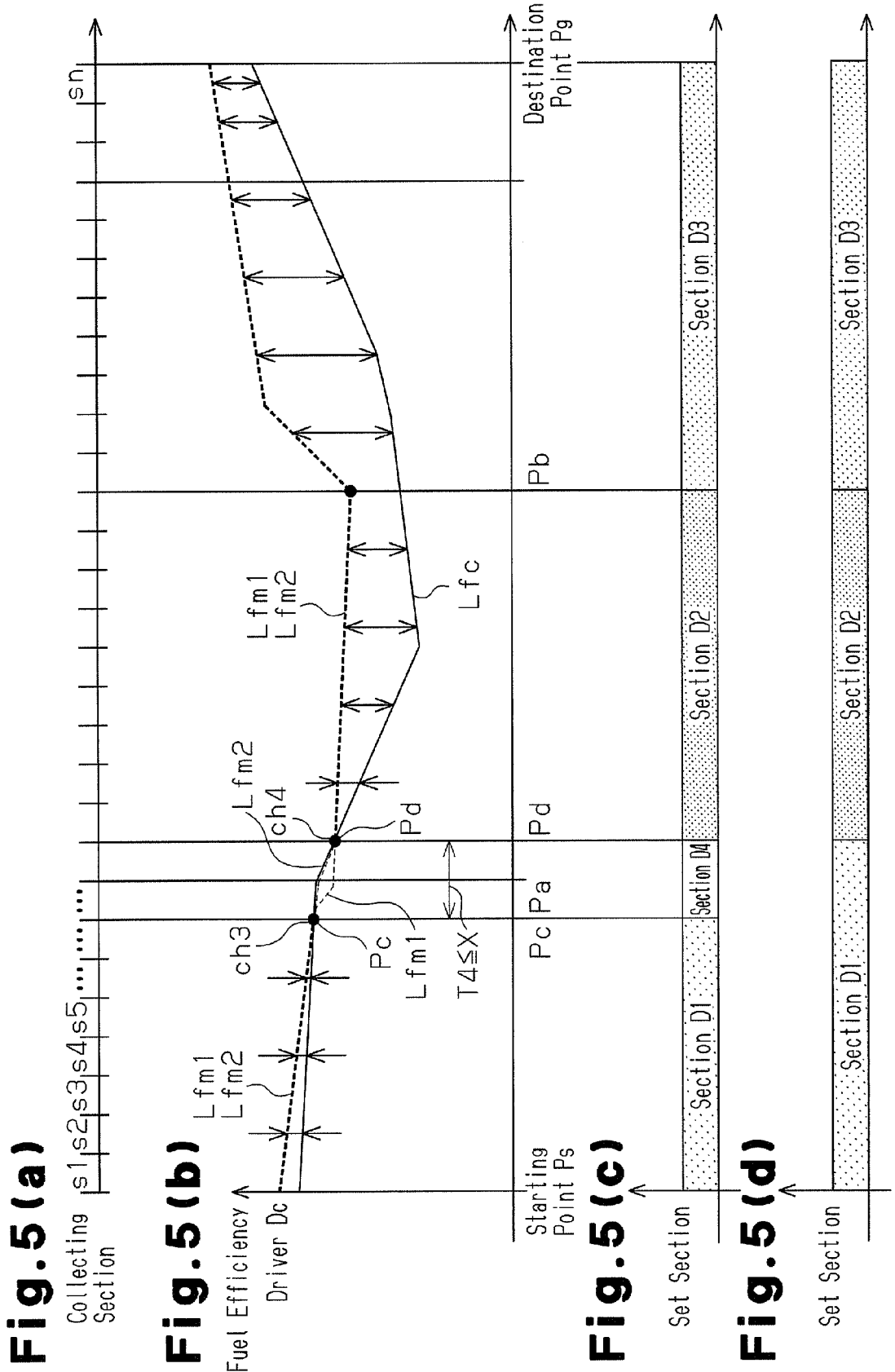

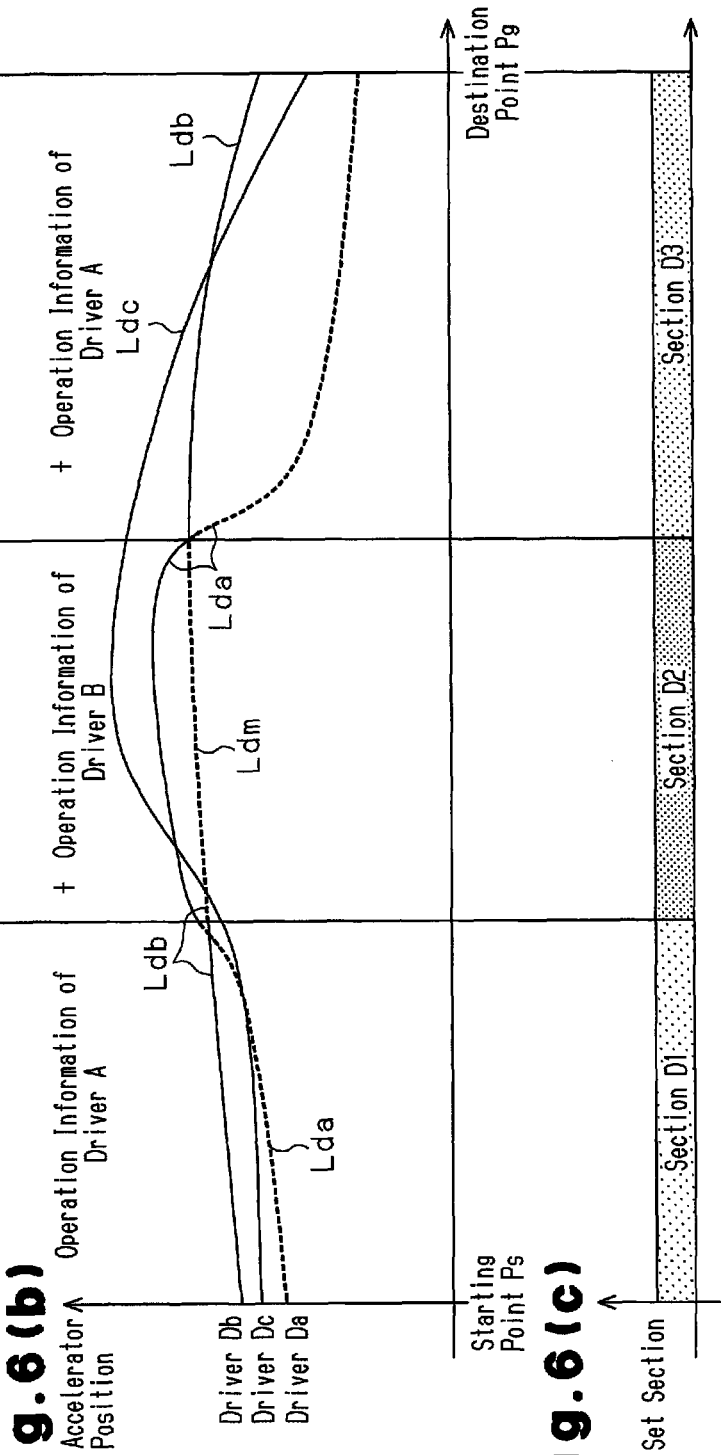

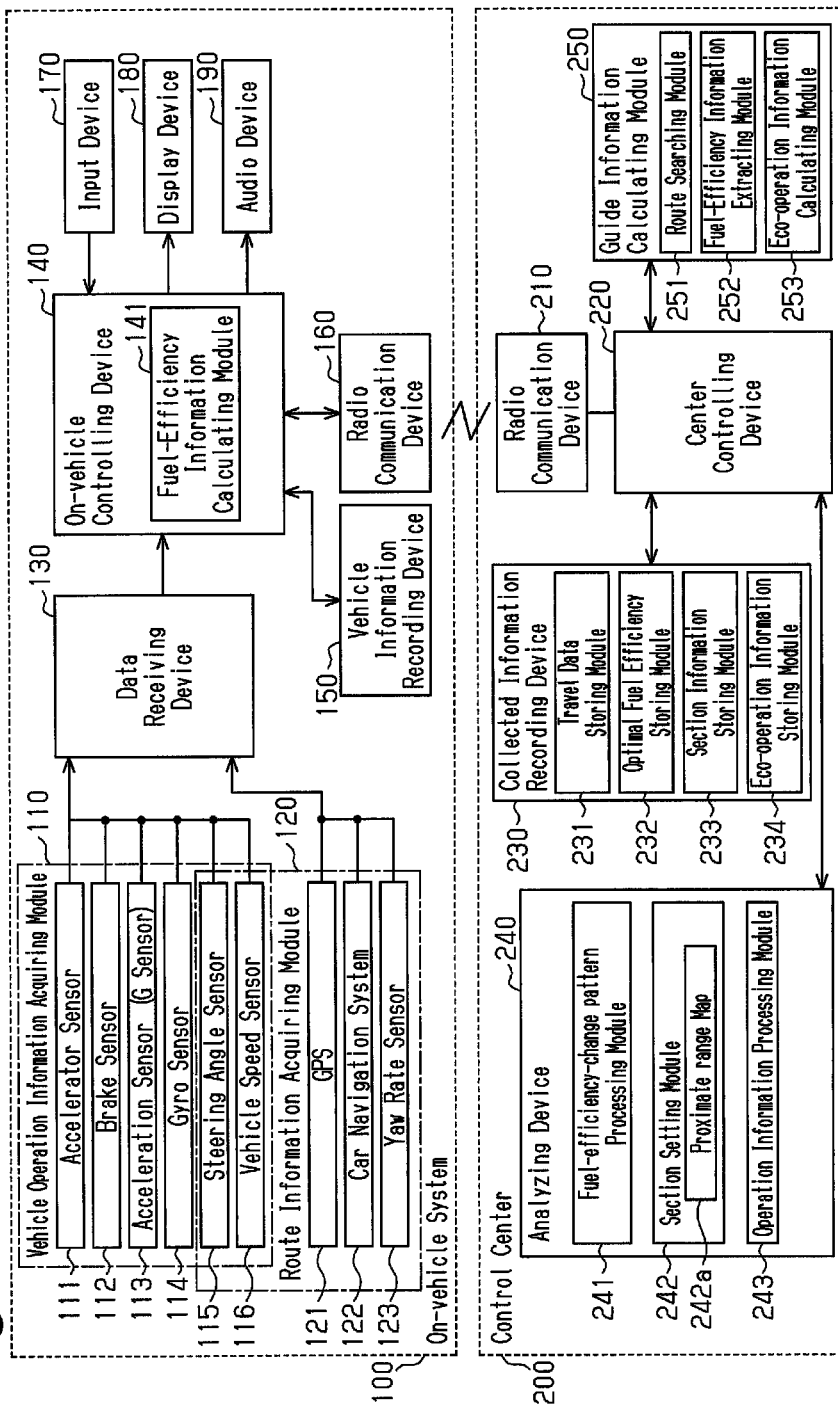

| Traffic Element/Time (h) | 00~06 | 06~09 | 09~12 | 12~15 | 15~18 | 18~21 | 21~24 |
|---|---|---|---|---|---|---|---|
| Urban Area | X1 | X2 | X3 | X4 | X5 | X6 | X7 |
| Suburbs | X8 | X9 | X10 | X11 | X12 | X13 | X14 |
| Highway | X15 | X16 | X17 | X18 | X19 | X20 | X21 |
| ... | ... | ... | ... | ... | ... | ... | ... |
| ... | ... | ... | ... | ... | ... | ... | ... |

SECTION SETTING METHOD, MILEAGE INFORMATION GENERATION DEVICE, AND OPERATION ASSIST DEVICE

FIELD OF THE DISCLOSURE

The present invention relates to a section setting method of setting a section based on fuel-efficiency information of a vehicle. Further, the present invention relates to a fuel-efficiency information generation device that generates the fuel-efficiency information in the set section, and yet further relates to a drive assist device that performs drive assistance based on the set section.

BACKGROUND OF THE DISCLOSURE

Recent drive assistance systems using a car navigation system and the like, in many cases, present recommended routes from a current location to a destination point, and provide information related to a predicted fuel consumption for each case of taking the respective routes, that is, fuel-efficiency information. Hereinbelow, "fuel efficiency" means travelled distance of a vehicle per unit quantity of fuel. In such a case, a driver (person who drives the vehicle) refers to the recommended routes and the fuel-efficiency information for each of the recommended routes as provided, and selects a route. Conventionally, drive assistance systems as described for example in Patent Document 1 and Patent Document 2 are known as such drive assistance systems.

For example, in Patent Document 1, a server provided in a control center configures a fuel-efficiency information processing system. The server collects respective fuel-efficiency information of an unspecified large number of vehicles during driving along with moment-to-moment location information of those vehicles by radio communication. The server collects statistics of the fuel-efficiency information for each fuel-efficiency-influencing factor that influences the fuel efficiency such as upgrades and curves by referencing map information registered in a map database based on the collected location information.

Further, a fuel-efficiency information providing device for providing the fuel-efficiency information to the destination point is installed in each vehicle to configure the fuel-efficiency information processing system. The fuel-efficiency information providing device stores fuel-efficiency information based on a driving record of the device mounting vehicle for each fuel-efficiency-influencing factor. The fuel-efficiency information providing device handles averages and modes of the stored fuel-efficiency information as the fuel-efficiency information for each fuel-efficiency-influencing factor of the device mounting vehicle. The fuel-efficiency information providing device evaluates a degree of dispersion of the fuel-efficiency information of the device mounting vehicle relative to the fuel-efficiency statistics based on a comparison of the fuel-efficiency information for each fuel-efficiency-influencing factor based on the driving record of the device mounting vehicle with the fuel-efficiency information for each fuel-efficiency-influencing factor that has been statistically collected by the server. Accordingly, when the destination point is set by the driver in the car navigation installed in the vehicle, the fuel-efficiency information providing device acquires the fuel-efficiency statistics related to the fuel-efficiency-influencing factors existing in the route from the current location to the destination point from the server. At the same time, the fuel-efficiency information providing device searches the route to the destination point based on the acquired fuel-efficiency statistics and the evaluated degree of dispersion, and predicts the predicted fuel-efficiency consumption in the case of taking the route. The fuel-efficiency information providing device provides information including the predicted fuel-efficiency consumption, the fuel-efficiency-influencing factors existing in the searched route, and the influences of these fuel-efficiency-influencing factors on the fuel efficiency of the vehicle respectively to the driver.

Further, the drive assistance system of Patent Document 2 calculates a fuel efficiency from a starting point to a destination point and such a fuel efficiency for each of links, which are unit sections that are sectioned by a certain intersection to a subsequent intersection and the like, based on actual fuel-efficiency information of a plurality of vehicles that has been collected at a control center. The drive assistance system calculates predicted fuel-efficiency information from the current location to the destination point based on the calculated information related to the fuel efficiency, and fuel-efficiency-influencing factors such as time ranges when the information are acquired and road grades, and provides the predicted values to the driver for example via a display device.

As above, according to the drive assistance systems of Patent Document 1 and Patent Document 2, the driver is enabled to obtain the fuel-efficiency information required from the current location to the destination point and the presence of the fuel-efficiency-influencing factors. Accordingly, the driver can select routes and operate the vehicle with the information that is respectively provided as indexes.

PRIOR ART DOCUMENT

Patent Document

Patent Document 1: Japanese Laid-Open Patent Publication No. 2009-250930

Patent Document 2: Japanese Laid-Open Patent Publication No. 2006-78326

SUMMARY OF THE INVENTION

Problems that the Invention is to Solve

Links registered in map information to indicate fuel-efficiency-influencing factors in a typical navigation device and the like are mere road sections, which are obtained by dividing a road into section units corresponding to intersections and road grades such as upgrades. On the other hand, vehicle operations such as a decelerating operation at an intersection or a stop position and an adjustment of an accelerator position on a sloped road are performed as one series of vehicle operation from before reaching the intersection, the sloped road and the like, until after having passed the intersection, the sloped road and the like. Due to this, even if fuel-efficiency information for each route is generated based on the sections such as the conventional links, such fuel-efficiency information may not necessarily be information related to an optimal fuel efficiency that can actually be achieved. Thus, even if a drive assistance system informs a driver of the actual fuel efficiency for each route based on such fuel-efficiency information, accurate fuel-efficiency information for energy-efficient driving may not surely be provided to the driver.

Further, the vehicle operation by the driver in which the fuel efficiency is taken into consideration differs for each driver depending on the driver's inherent habits. Due to this, the actual fuel efficiency in which the vehicle operation is reflected differs for each driver. Thus, even if the fuel-efficiency information based on the vehicle operation of one driver is for example collected, and fuel-efficiency information is generated based on the collected information, such fuel-efficiency information may not necessarily be the optimal fuel-efficiency information that can be achieved in a route in which the fuel-efficiency-influencing factors such as the intersection and the upgrade exist.

On the other hand, even in the case where the fuel-efficiency information by a plurality of drivers that has been respectively collected is calculated as a statistic value for each fuel-efficiency-influencing factor as in the drive assistance system described in Patent Document 1, or even in the case where the fuel-efficiency information by a plurality of drivers are simply aggregated as in the drive assistance system described in Patent Document 2, information related to the optimal fuel efficiency that can be achieved in each route may not surely be calculated.

An objective of the present invention is to provide a section setting method that can calculate the information related to the actual fuel efficiency that can be achieved under the vehicle operation that has been performed with consideration given to the fuel efficiency. Another objective of the present invention is to provide a fuel-efficiency information generation device that can calculate information related to the actual fuel efficiency for each route based on set sections, and yet another objective is to provide a drive assist device that can assist a vehicle operation with better fuel efficiency based on the set sections.

Means for Solving the Problems

Hereinbelow, means for solving the above problems, and operational effects thereof will be described.

A section setting method provided by one aspect of the present invention primarily includes: collecting fuel-efficiency information that is information related to a fuel efficiency of a vehicle that travels from a starting point to a destination point and is obtained under a plurality of types of vehicle operations together with location information of the vehicle at each time; comparing change patterns in the collected fuel-efficiency information for each of the location information; connecting change pattern sections, which are parts of the change patterns sequentially from the starting point to the destination point based on a result of the comparison; and setting, as a section to be used for calculation of actual fuel efficiency, a section that is obtained by dividing a route at positions corresponding to connection points of the connected change pattern sections.

When a driver performs energy-efficient driving, it would be smooth to perform vehicle operations such as a decelerating operation at an intersection or a stop position and an adjustment of an accelerator position in a sloped road as one series of vehicle operations from before reaching the intersection, the sloped road and the like until having passed the intersection, the sloped road and the like. An actual fuel efficiency, which reflects such vehicle operations, tends to differ depending on fuel-efficiency-influencing factors that influence fuel efficiency such as intersections, sloped roads and the like, and also for each driver. In addition, it may differ depending on a moment-to-moment traffic condition and the like even for the same driver. On the other hand, for fuel efficiency at a point where no fuel-efficiency-influencing factor exists, a difference between the drivers becomes small. From such findings, in order to provide the actual fuel efficiency of the route from a starting point to a destination point to the driver, the above method selects any portions of a plurality of fuel-efficiency-change patterns for each of positions from the starting point to the destination point, and sequentially connects the selected fuel-efficiency-change pattern sections from the starting point to the destination point. The sections are respectively obtained by dividing the route by joints (connection points; changing points where a certain fuel-efficiency-change pattern changes to another fuel-efficiency-change pattern; connecting points; inflecting points). In so doing, the obtained sections respectively correspond to sections in which one of the drivers has performed the series of vehicle operation in connection to the fuel-efficiency-influencing factors existing in the sections.

According to the above method, the section in which a certain driver has performed a series of vehicle operations under a certain fuel-efficiency-influencing factor is set as one of a plurality of section units that are obtained by dividing the route from the starting point to the destination point. That is, by calculating the fuel efficiency based on such set sections, actual fuel efficiency that can smoothly be achieved can be calculated for each of the routes from the starting point to the destination point.

In one embodiment of the present invention, primarily, the connecting includes connecting change pattern sections, which are parts of the change patterns sequentially from the starting point to the destination point based on the result of the comparison to optimize the fuel efficiency from the starting point to the destination point, and the setting a section includes setting, as a section used for a calculation of the optimal fuel efficiency, a section that is obtained by dividing the route at positions corresponding to the connection points of the connected change pattern sections.

According to the above method, in order to achieve the optimal fuel efficiency in a route from the starting point to the destination point, the optimal portion among a plurality of fuel-efficiency-change patterns is selected for each of the positions from the starting point to the destination point, and the selected optimal fuel-efficiency-change pattern sections are sequentially connected from the starting point to the destination point. Then, by dividing the route at the joints of the connections, the respective sections are obtained. In so doing, the obtained sections respectively correspond to sections in which one of the drivers has performed the series of vehicle operations that are economically smartest in connection to the fuel-efficiency-influencing factors existing in the sections, that is, the optimal energy-efficient driving.

According to the above method, a section in which a certain driver has performed the economically smartest series of vehicle operations under a certain fuel-efficiency-influencing factor is set as one of the plurality of section units that divides the route from the starting point to the destination point. That is, by calculating the fuel efficiency based on the sections that are set as above, the optimal fuel efficiency that can smoothly be achieved for each of the routes from the starting point to the destination point can be calculated.

In one embodiment of the present invention, primarily, the connecting includes connecting change pattern sections, which are parts of the change patterns, sequentially from the starting point to the destination point based on the result of the comparison to minimize the fuel efficiency from the starting point to the destination point, and the setting a section includes setting, as a section to be used for a calculation of the minimum fuel efficiency, a section that is obtained by dividing the route at positions corresponding to the connection points of the connected change pattern sections.

According to the above method, in order to avoid the minimum fuel efficiency in a route from the starting point to the destination point, the minimum portion among a plurality of fuel-efficiency-change patterns is selected for each of the positions from the starting point to the destination point, and the selected minimum fuel-efficiency-change pattern sections are sequentially connected from the starting point to the destination point. Then, by dividing the route at the joints of the connections, the respective sections are obtained. In so doing, the obtained sections respectively correspond to sections in which any of the drivers has performed a series of vehicle operations with the lowest economical efficiency, that is, a vehicle operation by which the fuel efficiency is worsened in connection to the fuel-efficiency-influencing factors existing in the sections.

According to the above method, a section in which a certain driver has performed a series of vehicle operations with the lowest economical efficiency under a certain fuel-efficiency-influencing factor is set as one of a plurality of section units that divides the route from the starting point to the destination point. That is, by calculating the fuel efficiency based on such set sections, the minimum fuel efficiency that is expected when the vehicle operation with the lowest economical efficiency is performed can be calculated for each of the routes from the starting point to the destination point.

In one embodiment of the present invention, primarily, the collecting includes collecting the fuel efficiency information in fuel-efficiency-information-collecting sections, which are the minimum section units for collecting the fuel efficiency information, and the comparing includes comparing the change pattern sections for each fuel-efficiency-information-collecting sections.

Generally, a control center and the like that collects various types of information from a plurality of vehicles collects information for each route in certain sections, such as fuel-efficiency-information-collecting sections. Due to this, as in the above method, by comparing the fuel efficiency information for each of the fuel-efficiency-information-collecting sections, if the change pattern sections of the fuel efficiency information with which the fuel efficiency from the starting point to the destination point for example becomes optimal are sequentially connected, the fuel efficiency information that is collected every 10 meters for example can be compared. Accordingly, for example, a section of 30 meters can be set as a set section in the setting of the sections to include a certain sloped road (fuel-efficiency-influencing factor), and route portions (points) where series of vehicle operations has been performed in order to achieve for example the optimal fuel efficiency in connection to the sloped road. The change pattern sections of the fuel efficiency information are connected to obtain for example the optimal fuel efficiency by comparing the fuel efficiency information in fuel-efficiency-information-collecting sections. Thus, the respective routes from a current location to a destination point can be divided with consecutive plurality of fuel-efficiency-information-collecting sections as the units. That is, the consecutive plurality of fuel-efficiency-information-collecting sections can suitably be set as set sections that are combined in each fuel-efficiency-influencing factors. Due to this, the setting of the set sections based on the fuel efficiency information collectively collected by the control center and the like can easily and accurately be performed. That is, practicability as the section setting method is further improved.

In one embodiment of the present invention, primarily, the section setting method further includes setting a proximate range-determining value for determining whether a distance of a section that is obtained by dividing the route based on the connection points is within a proximate range of a section that is immediately before or after the section; integrating the sections that are before and after the connection point into one section if the distance is less than or equal to the proximate range-determining value; and fixing the sections that are before and after the connection point as separate sections if the section exceeds the proximate range-determining value.

The optimal fuel-efficiency-change pattern that is obtained by connecting the change pattern sections so that the optimal fuel efficiency is obtained from the starting point to the destination point based for example on the plurality of types of vehicle operations becomes more complicated with a larger number of collected fuel efficiency information, and a number of sections divided by the connection points also become large. On the other hand, as to a section necessary for a driver to perform series of vehicle operation in connection to the fuel-efficiency-influencing factors such as an intersection and a sloped road, since it would be difficult for the driver to follow if the distance thereof is too short, it is desirable to have a certain distance ensured. For example, even if the section setting is executed by dividing the route by every few meters, such section setting is not necessarily suitable for the actual circumstance. Thus, as in this method, if only the sections that exceed the proximate range-determining value are set as new sections, the new sections can be prevented from becoming excessively short. Therefore, section setting that is more suitable for the actual circumstance by which the driver can more easily perform the vehicle operations can be performed. Further, in a case where at least one of the previous and subsequent section that sandwiches a connection point is of a length in the proximate range-determining value or less, the previous and subsequent sections are integrated into one section unit. Thus, the occurrence of switching to a new set section in the middle of a fuel-efficiency-influencing factor such as the intersection can be prevented. Due to this, a setting of a section that surely includes the fuel-efficiency-influencing factor and the distance necessary for performing the series of vehicle operation in connection to the fuel-efficiency-influencing factor is achieved.

In one embodiment of the present invention, primarily, the setting of the determination value configures the proximate range-determining value to be variable in accordance with a traffic environment.

The distance necessary for a driver to perform the series of vehicle operations in connection to a fuel-efficiency-influencing factor is in a fluid range that may be influenced by the traffic environment such as being in an urban area or suburbs, or day and time and the like. For example, in the urban area, frequency of existence of fuel-efficiency-influencing factors such as intersections and stop positions is high, and the distance between fuel-efficiency-influencing factors tends to be short. On the other hand, in the suburbs, the frequency of existence of fuel-efficiency-influencing factors is low, and the distance between fuel-efficiency-influencing factors tends to be long. Due to this, according to this method, if the proximate range-determining value is variable in accordance with the traffic environment, the section setting can be performed by the determination based on the proximate range-determining value. In so doing, the section setting can be performed more suitably complying with the traffic environment when the respective fuel efficiency information is collected.

In one embodiment of the present invention, primarily, the collecting acquires the fuel efficiency information of each vehicle, and the setting of the section sets the section for each vehicle.

Generally, the vehicle information for each vehicle collected by the control center and the like includes fuel efficiency information in which habits of the driver are reflected. That is, normally, the vehicle information for each vehicle includes the fuel efficiency information in which habits of an owner of the vehicle are reflected. According to this method, the fuel efficiency information collected from each vehicle can be handled by regarding the fuel efficiency information as fuel efficiency information in each driver. For example, while a certain driver has less fuel consumption in intersections, the drier may exhibit a tendency of large fuel consumption on sloped roads. Further, while another driver has large fuel consumption in the intersections, the driver may exhibit a tendency of less fuel consumption on the sloped roads. Accordingly, the change patterns of the fuel efficiency information have a strong tendency of being changed depending on the drivers' inherent habits.

Thus, according to the method, by performing the section setting for each driver (vehicle), relevance of the vehicle operation that achieves, for example, the optimal fuel efficiency (actual fuel efficiency) and the set sections can be increased. Thus, the section setting in which the series of vehicle operations in connection to the fuel-efficiency-influencing factors becomes easier.

In another aspect of the present invention, a fuel efficiency information generation device configured to generate fuel efficiency information that is information related to a fuel efficiency of a vehicle that travels between a starting point and a destination point is provided. The fuel efficiency information generation device is primarily configured to search routes from the starting point to the destination point; and to calculate an actual fuel efficiency for each of the searched routes based on information related to a fuel efficiency obtained by connecting change pattern sections of the fuel efficiency information for each of sections that are set based on the section setting method as described above.

According to the configuration, the actual fuel efficiency for each route is calculated based on the route search from the starting point to the destination point and the information related to the fuel efficiencies that are connected in setting the sections. Due to this, in each of the routes from the starting point to the destination point, the information related to the actual fuel efficiency can be calculated by combining the respective fuel efficiencies obtained under the plurality of types of vehicle operations. Due to this, the information related to the actual fuel efficiency that can smoothly be achieved can be calculated in each route.

In one embodiment of the present invention, primarily, the fuel efficiency information generation device is configured to calculate, as the actual fuel efficiency, optimal fuel efficiency information that is information related to an optimal fuel efficiency obtained by connecting change pattern sections of the fuel efficiency information to optimize the fuel efficiency from the starting point to the destination point, and calculate the optimal fuel efficiency for each of the searched routes based on the calculated optimal fuel efficiency information.

According to this configuration, the optimal fuel efficiency for each route is calculated based on the route search from the starting point to the destination point and the information related to the fuel efficiencies connected upon setting the sections. Due to this, the fuel efficiency information generation device can calculate the optimal fuel efficiency information by combining the respective optimal fuel efficiencies obtained under the plurality of types of vehicle information in each of the routes from the starting point to the destination point. Due to this, the information related to the optimal fuel efficiency that can be achieved under the vehicle operation performed with considering the fuel efficiency can be calculated in each route.

In one embodiment of the present invention, primarily, the fuel efficiency information generation device is configured to calculate, as the actual fuel efficiency, minimum fuel efficiency information that is information related to a minimum fuel efficiency obtained by connecting the change pattern sections of the fuel efficiency information to minimize the fuel efficiency from the starting point to the destination point, and calculate the minimum fuel efficiency for each of the searched routes based on the calculated minimum fuel efficiency information.

According to the configuration, the minimum fuel efficiency for each route is calculated based on the route search from the starting point to the destination point and the information related to the fuel efficiencies that are connected in setting the sections. Due to this, the fuel efficiency information generation device can calculate the minimum fuel efficiency information by combining the respective minimum fuel efficiencies obtained under the plurality of types of vehicle information in each of the routes from the starting point to the destination point. Due to this, the fuel efficiency that is expected when a vehicle operation with low economical efficiency is performed can be calculated for each route.

In one embodiment of the present invention, primarily, a plurality of vehicles that respectively include a radio communication function and travel in the same section are configured to transmit information to a control center of a probe information communication system, the control center is configured to calculate the fuel efficiency information based on the transmitted information, and the fuel efficiency information generation device is configured to request the control center of the information related to the actual fuel efficiency.

According to the configuration, based on the information that the plurality of vehicles that travel in the same section have transmitted to the control center of the probe information communication system, or probe information, the control center collects the fuel efficiency information of the respective vehicles. By doing so, the control center can acquire the various types of information such as the fuel efficiency information and the location information from the plurality of vehicles that are actually travelling on the road. The control center manages such information, and performs the setting of the sections. Thus, the control center can collectively perform the collection of respective elements for the calculation of the actual fuel efficiency, the setting of the sections based on the elements, the calculation of the fuel efficiency information in the set sections, and distribution to the respective vehicles.

Further, according to this configuration, the control center can distribute the route search for each section and the information related to the actual fuel efficiency for each of the searched routes to the drive assist device in each vehicle or to various types of terminals responsive to requests via various types of communication modules such as a radio communication function of the vehicles and the Internet. Thus, the practicability of the information related to the actual fuel efficiency calculated based on the set sections can be increased.

According to another aspect of the present invention, a drive assist device that assists driving of a driver by providing fuel efficiency information, which is information related to a fuel efficiency of a vehicle that travels between a starting point and a destination point is provided. The drive assist device is primarily configured to search routes from the starting point to the destination point. The drive assist device is further configured to provide information related to an actual fuel efficiency for each of the searched routes based on the information related to the fuel efficiency that is obtained by connecting change pattern sections of the fuel efficiency information for each of sections that are set based on the section setting method as described above.

According to the configuration, the actual fuel efficiency for each route is calculated based on the information related to the fuel efficiencies that are connected in setting the sections at the same time as the route search from the starting point to the destination point is calculated. Due to this, in each of the routes from the starting point to the destination point, the fuel efficiency information in which the respective fuel efficiencies obtained under the plurality of types of vehicle operations are combined can be calculated. Due to this, the drive assist device can provide the information related to the actual fuel efficiency that can smoothly be achieved in each route.

In one embodiment of the present invention, primarily, the drive assist device is configured to calculate, as the actual fuel efficiency, optimal fuel efficiency information that is information related to an optimal fuel efficiency obtained by connecting change pattern sections of the fuel efficiency information to optimize the fuel efficiency from the starting point to the destination point, and calculate an optimal fuel efficiency for each of the searched routes based on the calculated optimal fuel efficiency information.

According to the configuration, the optimal fuel efficiency for each route is calculated based on the information related to the optimal fuel efficiencies that are connected in setting the sections at the same time as the route search from the starting point to the destination point is calculated. Due to this, in each of the routes from the starting point to the destination point, the fuel efficiency information in which the respective optimal fuel efficiencies obtained under the plurality of types of vehicle operations are combined can be calculated. Due to this, the drive assist device can provide the information related to the optimal fuel efficiency that can be achieved under the vehicle operation performed with considering the fuel efficiency in each route.

In one embodiment of the present invention, primarily, the drive assist device calculates, as the actual fuel efficiency, minimum fuel efficiency information that is information related to a minimum fuel efficiency obtained by connecting the change pattern sections of the fuel efficiency information so that the fuel efficiency from the starting point to the destination point becomes minimum, and calculates the minimum fuel efficiency for each of the searched routes based on the calculated minimum fuel efficiency information.

According to the configuration, the minimum fuel efficiency for each route is calculated based on the information related to the minimum fuel efficiencies that are connected in setting the sections at the same time as the route search from the starting point to the destination point is calculated. Due to this, in each of the routes from the starting point to the destination point, the fuel efficiency information in which the respective minimum fuel efficiencies obtained under the plurality of types of vehicle operations are combined can be calculated. Due to this, the drive assist device can provide the information related to the minimum fuel efficiency that is expected when the vehicle operation with the low economical efficiency is performed in each route.

In one embodiment of the present invention, primarily, the fuel efficiency information includes vehicle operation information as information related to a vehicle operation that has been performed when the fuel efficiency information is acquired. As one form of the drive assistance, the drive assist device is configured to provide the driver with the vehicle operation information included in the respective change pattern sections that configure the information related to the actual fuel efficiency to the driver.

According to the configuration, the drive assist device can provide the information related to the vehicle operation included in each of the connected fuel efficiency information to the driver. That is, together with the information provided as the actual fuel efficiency from the starting point to the destination point, the drive assist device can provide the information regarding the vehicle operation for achieving the provided actual fuel efficiency to the driver. A possibility of achieving the connected actual fuel efficiency is suitably increased by providing the information regarding the vehicle operation as above.

In one embodiment of the present invention, primarily, the drive assist device is configured to generate the vehicle operation information to be provided to the driver based on comparing the vehicle operation information included in the respective change pattern sections that configure the information related to the actual fuel efficiency with information related to a vehicle operation of the device mounting vehicle for each of the searched route.

Generally, a vehicle operation that is effective for achieving the actual fuel efficiency varies depending on the driving technique of individual drivers. In this regard, according to the configuration, the drive assist device generates the information regarding the vehicle operation to be provided to the driver as one form of the drive assistance based on comparing the information regarding the vehicle operation included in each of the connected fuel efficiency information to the information regarding the vehicle operation of the device mounting vehicle. As a result, the drive assist device can provide the information regarding the vehicle operation to the driver in accordance with the driving technique and inherent habits of the driver.

In one embodiment of the present invention, primarily, the drive assist device further includes a display device that displays the fuel efficiency information, and the drive assist device is configured to cause the display device to display the information related to the actual fuel efficiency for each of the searched routes that have been searched from a current location to the destination point.

According to the configuration, the drive assist device displays the information regarding the actual fuel efficiency in the display device included in, for example, a car navigation system and the like for each of the routes in which the information regarding the actual fuel efficiency is searched. As a result, the information regarding the actual fuel efficiency can be provided to the driver together with the information for each route from the starting point to the destination point.

In one embodiment of the present invention, primarily, the drive assist device includes a control center of a probe information communication system, the control center is configured to calculate the fuel efficiency information based on information transmitted via radio communication from a plurality of vehicles travelling in the same section, and the control center is configured to provide, in response to a request, the information related to the actual fuel efficiency among the calculated fuel efficiency information.

According to the configuration, the control center collects the fuel efficiency information of the respective vehicles based on the information transmitted from the plurality of vehicles travelling on the same section, or probe information. That is, the drive assist device can easily acquire the various types of information such as the fuel efficiency information and the location information from the plurality of vehicles that are actually travelling on the road. By the control center managing such information and the control center performing the setting of the sections, the control center can collectively perform the collection of the respective elements for the calculation of the actual fuel efficiency, the setting of the sections based on the respective elements, the calculation of the fuel efficiency information in the set sections, and distribution of the information.

Further, the drive assist device configured as above can perform the route search in each section and the acquisition of the information regarding the actual fuel efficiency for each of the searched routes responsive to the requests via the radio communication function and the like. Thus, the drive assist device can implement the energy-efficient driving assistance based on the minimum required calculation and the minimum amount of information.

BRIEF DESCRIPTION OF THE DRAWINGS

FIG. 1 relates to a section setting method, a fuel efficiency information generation device, and a drive assist device of a first embodiment, where FIG. 1(a) is a diagram showing a relationship of an intersection and a curve as fuel-efficiency-influencing factors and a vehicle, and FIG. 1(b) is a diagram showing an example of a fuel-efficiency-change pattern in connection to the fuel-efficiency-influencing factors;

FIG. 2(a) is a diagram showing a relationship of an intersection and a curve as fuel-efficiency-influencing factors and a vehicle;

FIG. 2(b) is a diagram showing an example of a fuel-efficiency-change pattern in connection to the fuel-efficiency-influencing factors;

FIG. 3(a) is a diagram showing an example of fuel-efficiency-information-collecting sections;

FIG. 3(b) is a diagram showing an example of a fuel-efficiency-change pattern of a driver from a starting point to a destination point;

FIG. 3(c) is a diagram showing a section setting based on the driver's fuel-efficiency-change pattern;

FIG. 4(a) is a diagram showing an example of fuel-efficiency-information-collecting sections;

FIG. 4(b) is a diagram showing an example of a fuel-efficiency-change pattern of each driver from a starting point to a destination point;

FIG. 4(c) is a diagram showing a section setting based on each driver's fuel-efficiency-change pattern;

FIG. 5(a) is a diagram showing an example of fuel-efficiency-information-collecting sections;

FIG. 5(b) is a diagram showing an example of a fuel-efficiency-change pattern of each driver from a starting point to a destination point;

FIGS. 5(c) and 5(d) are diagrams showing section settings based on each driver's fuel-efficiency-change pattern;

FIG. 6(a) is a diagram showing an example of fuel-efficiency-information-collecting sections;

FIG. 6(b) is a diagram showing an example of an accelerator position change pattern of each driver from a starting point to a destination point;

FIG. 6(c) is a diagram showing an example of a section setting based on each driver's fuel-efficiency-change pattern;

FIG. 7 is a block diagram showing a conceptual diagram of a system to which the section setting method, the fuel efficiency information generation device, and the drive assist device of the first embodiment are adapted;

FIG. 8 is a diagram showing an example of a proximate range map of the embodiment;

DETAILED DESCRIPTION OF THE PREFERRED EMBODIMENTS

Figure 9:
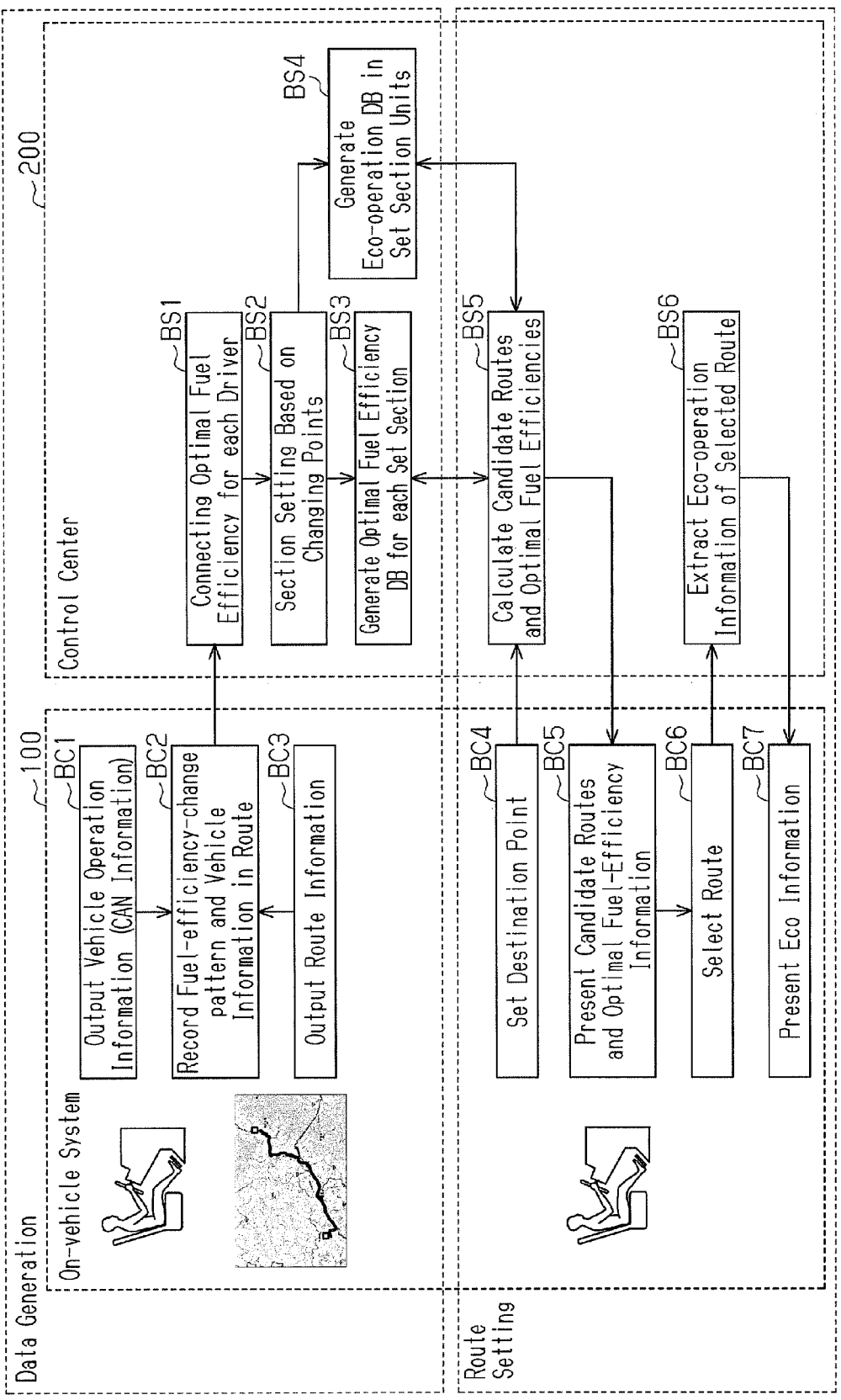
FIG. 9 is a functional block diagram showing schematic configurations of on-vehicle systems and a control center of the embodiment.

FIGS. 1 to 12 illustrate a section setting method, a fuel efficiency information generation device, and a drive assist device according to a first embodiment of the present invention. FIGS. 1 and 2 show a principle of a section setting method of the present embodiment. FIG. 1(a) shows an intersection A1 and an S-shaped curve A2 as fuel-efficiency-influencing factors, which influence fuel efficiencies of a first car C1 and a second car C2. "Fuel efficiency of a car" means a travelled distance of the car per unit quantity of fuel. FIG. 1(b) shows a first fuel-efficiency-change pattern L1, which is a change pattern example of the fuel efficiency when the first car C1 travels through the intersection A1 and the S-shaped curve A2 of FIG. 1(a), and a second fuel-efficiency-change pattern L2, which is a change pattern example of the fuel efficiency when the second car C2 travels therethrough. FIG. 2(a) shows the same drawing as FIG. 1(a). FIG. 2(b) shows an optimal fuel-efficiency-change pattern L3, which is a change pattern example showing an optimal fuel efficiency created from the first fuel-efficiency-change pattern L1 and the second fuel-efficiency-change pattern L2.

As shown in FIG. 1(a), it is supposed that a first car C1, which is driven by a first driver A, moves toward the intersection A1 having a traffic light AS, and a second car C2, which is driven by a second driver B, moves toward the S-shaped curve A2 having a predetermined curvature. When the first car C1 and the second car C2 pass the intersection A1 and the S-shaped curve A2, the first driver A and the second driver B are supposed as having performed energy-efficient driving, which is a vehicle operation taking fuel efficiency into consideration.

For example, the first driver A decelerates the first car C1 from before entering the intersection A1, that is, from a first point P1, which is at a predetermined distance from the intersection A1 to the intersection A1. Further, the first driver A accelerates the first car C1 from the intersection A1 to a second point P2, which is a predetermined distance ahead of the intersection A1. That is, the first driver A performs a series of a decelerating operation and an accelerating operation from before entering and until after having passed the intersection A1. At the S-shaped curve A2 subsequent to the intersection A1, the first driver A performs the decelerating operation from a point before the first car C1 enters the S-shaped curve A2 (for example, the second point P2). The first driver A operates to turn right to cause the first car C1 pass a first curve in the S-shaped curve A2, and then returns the handle steering at the next curve. Then, the first driver A performs the accelerating operation from an end of the S-shaped curve A2 to a third point P3, which is away from the S-shaped curve A2 by a predetermined distance on a straight road. The first driver A performs the above series of vehicle operation.

FIG. 1(a) shows a first link Li1 to a fourth link Li4, which are "links" handled in the navigation device and the like. For example, a road section of a straight road from a traffic light (not shown) before the first point P1 to the traffic light at an entrance of the intersection A1 is shown as the first link Li1. Further, a road section of a straight road from the intersection A1 to an entrance of the S-shaped curve A2 is shown as the second link Li2. A road section of a curved road from an entrance to an exit of the S-shaped curve A2 is shown as the third link Li3. A road section of a straight road from the exit of the S-shaped curve A2 to a traffic light (not shown) farther ahead than the third point P3 is shown as the fourth link Li4. That is, these first link Li1 to fourth link Li4 are road sections that are primarily sectioned by traffic signs such as the traffic lights, the intersection A1, and the S-shaped curve A2, or "links" handled in the navigation device and the like.

In connection to this, FIG. 1(a) further shows a first set section Sect1 from the first point P1 to the second point P2. Further, a second set section Sect2 from the second point P2 to the third point P3 is shown. The first set section Sect1 is a section in which the second driver B performed the series of operation in connection to the intersection A1. The second set section Sect2 is a section in which the first driver A performed the series of operation in connection to the S-shaped curve A2. A division between the first set section Sect1 and the second set section Sect2 (for example, the second point P2) exists within the second link Lit. That is, it can be understood well from FIG. 1(a) that the division between the first set section Sect1 and the second set section Sect2 has no relation with divisions between the first link Li1 to the fourth link Li4.

As shown in a solid line in FIG. 1(b), a change pattern of the fuel efficiency of the first car C1 by the first driver A, that is, a curved line of a first fuel-efficiency-change pattern L1 exhibits a peak in the first set section Sect1, and exhibits a valley in the second set section Sect2. That is, although the first driver A achieves a high fuel-efficiency-change pattern by having performed satisfactory energy-efficient driving in connection to the intersection A1, satisfactory energy-efficient driving could not have been performed in the S-shaped curve A2, so a low fuel-efficiency-change pattern is exhibited.

On the other hand, a change pattern of the fuel efficiency of the second car C2 by the second driver B, that is, a curved line of a second fuel-efficiency-change pattern L2 exhibits a small peak in the first set section Sect1, and exhibits a large peak in the second set section Sect2. That is, the second driver B performs an energy-efficient driving operation that is not so efficient as the first driver A in connection to the intersection A1, but performed energy-efficient driving that is better than the first driver A in the S-shaped curve A2 by rousing oneself to the action, and therefore, a high fuel-efficiency-change pattern is exhibited.

As shown at a left end of FIG. 1(b), the second fuel-efficiency-change pattern L2 is higher than the first fuel-efficiency-change pattern L1 before the first set section Sect1. Further, as shown at a right end of FIG. 1(b), the first fuel-efficiency-change pattern L1 is higher than the second fuel-efficiency-change pattern L2 after the second set section Sect2. That is, the first point P1, the second point P2, and the third point P3 respectively show which of the first fuel-efficiency-change pattern L1 or the second fuel-efficiency-change pattern L2 indicates the higher fuel efficiency, and a point at which a switch thereof takes place. A factor such as the intersection A1 and the S-shaped curve A2 that influences the fuel efficiency is referred to as a fuel-efficiency-influencing factor.

Accordingly, the fuel-efficiency-change patterns in connection to the same fuel-efficiency-influencing factor ordinarily differ between the first driver A and the second driver B depending on the driving techniques and inherent habits of the first driver A and the second driver B. In the example of FIG. 1(b), the fuel efficiency by the vehicle operation by the first driver A becomes an optimal fuel efficiency in the intersection A1, and the fuel efficiency by the vehicle operation by the second driver B becomes the optimal fuel efficiency in the S-shaped curve A2. That is, in the case of using both the first driver A and the second driver B as subjects, a portion of the first fuel-efficiency-change pattern L1 based on the vehicle operation of the first driver A at the intersection A1 (a first optimal fuel efficiency portion from a first connecting point ch1 to a second connecting point ch2 shown in FIG. 2(b)) is connected with a portion of the second fuel-efficiency-change pattern L2 based on the vehicle operation of the second driver B at the S-shaped curve A2 (a second optimal fuel efficiency portion from the second connecting point ch2 to a third connecting point ch3). It can be understood that a fuel-efficiency-change pattern after the above connection is the optimal fuel-efficiency-change pattern indicating the best fuel-efficiency-change pattern in a consecutive route (travelling route) of the intersection A1 and the S-shaped curve A2 shown in FIG. 1(a).

Thus, in the present embodiment, an optimal fuel-efficiency-change pattern L3 shown in FIG. 2(b) is set. As shown in FIG. 2(a), the optimal fuel-efficiency-change pattern L3 connects the fuel-efficiency-change pattern of a second set section (latter half of L2) by the vehicle operation of the second driver B to the fuel-efficiency-change pattern of a first set section Sect1 (former half of L1) by the vehicle operation of the first driver A in the route in which the S-shaped curve A2 follows subsequent to the intersection A1. Further, information related to the vehicle operation such as the decelerating operation, the accelerating operation, a rightward turning operation, and a leftward turning operation, which have been performed when the optimal fuel efficiency is achieved is set to be used as information related to the vehicle operation that are necessary for achieving the optimal fuel efficiency in the route of FIG. 2(a).

FIG. 2(b) shows the first connecting point ch1 to the third connecting point ch3 of the optimal fuel-efficiency-change pattern L3, corresponding one-to-one basis with the first point P1 to the third point P3, respectively. The first connecting point ch1 to the third connecting point ch3 respectively show joints (changing points, coupling points, inflecting points) of the first fuel-efficiency-change pattern L1, which is the optimal fuel efficiency based on the vehicle operation of the first driver A, and the second fuel-efficiency-change pattern L2 based on the vehicle operation of the second driver B.

Thus, a principle of the present embodiment divides the route by a plurality of types of vehicle operations, that is, of the first point P1 to third point P3 corresponding to the first connecting point ch1 to third connecting point ch3 by which the higher one and the lower one of the fuel-efficiency-change patterns switch in the first fuel-efficiency-change pattern L1, which is the optimal fuel-efficiency-change pattern by the vehicle operation of the first driver A, and the second fuel-efficiency-change pattern L2, which is the optimal fuel-efficiency-change pattern by the vehicle operation of the second driver B. The first set section Sect1 and the second set section Sect2 as the sections that are obtained by the above division of the route are set as the sections suitable for calculation of the optimal fuel efficiency in the route.

That is, by driving with the optimal fuel-efficiency-change pattern L3 as a model, the first driver A can operate to drive in the second set section Sect2 of the S-shaped curve A2, in which the energy-efficient driving cannot be suitably performed, by referring to the drive operation of the second driver B, who is good at the energy-efficient driving in the S-shaped curve A2 as the model. In the first set section Sect1 of the intersection A1 in which the first driver A is good at the energy-efficient driving, the first driver A can easily reproduce the driving operation with the satisfactory fuel efficiency that the first driver A has performed in the past by referring to the optimal fuel-efficiency-change pattern L3 as the model.

Similarly, by driving with the optimal fuel-efficiency-change pattern L3 as the model, the second driver B can operate to drive in the first set section Sect1 of the intersection A1, in which the energy-efficient driving cannot be suitably performed so well, by referring to the drive operation of the first driver A, who is good at the energy-efficient driving in the intersection A1 as the model. In the second set section Sect2 of the S-shaped curve A2, in which the second driver B is good at the energy-efficient driving, the second driver B can easily reproduce the driving operation with the satisfactory fuel efficiency that the second driver B has performed in the past by referring to the optimal fuel-efficiency-change pattern L3 as the model.

That is, in categorizing the series of vehicle operations with the fuel-efficiency-influencing factors such as the intersection A1 and the S-shaped curve A2, the first set section Sect1 and the second set section Sect2 are sections that are suitably sectioned, and are sections with which features of a driver's vehicle operation can be shown in an easily understood manner. That is, the first set section Sect1 and the second set section Sect2 differ from the first link Li1 to the fourth link Li4, which may set a division in the middle of the driver's series of vehicle operation and categorize according to this division.

FIGS. 3 to 6 show a section setting method of the present embodiment. FIG. 3 shows a section setting by a driving operation of a first driver Da, and FIG. 4 shows a section setting in which a driving operation of a second driver Db is further taken into account. FIG. 5 shows a section setting in which a driving operation of a third driver Dc is further taken into account. FIG. 6 shows fuel efficiency in FIG. 5 converted into accelerator position. That is, FIG. 6 shows how eco-operation information that is information related to a vehicle operation for achieving an optimal fuel efficiency is to be generated.

FIG. 3(a) shows fuel-efficiency-information-collecting sections s1 to sn as minimum section units for collecting the fuel efficiency information. FIGS. 4(a), 5(a), and 6(a) respectively are identical to FIG. 3(a). FIGS. 3(b) to 5(b) show fuel-efficiency-change patterns of each driver collected by a control center 200 (FIG. 7) in routes that are identical or similar to one another for each of the fuel-efficiency-information-collecting sections s1 to sn. FIGS. 3(c) to 5(c), 5(d), and 6(c) show set sections for calculating the optimal fuel efficiency that is set based on the fuel-efficiency-change patterns of each driver. Further, FIG. 6(b) shows an example of the vehicle operations of each driver.

A plurality of vehicles sends vehicle information (probe information) such as information related to the routes the vehicles travelled, fuel efficiency information, and vehicle operations. The control center 200 receives and collects such vehicle information for each of the fuel-efficiency-information-collecting sections s1 to sn shown in FIG. 3(a), and manages the vehicle information. The fuel-efficiency-information-collecting sections s1 to sn are set for example 10 meters each. That is, the control center 200 collects the vehicle information in routes that are identical or similar to one another from a starting point Ps to a destination point Pg from the plurality of vehicles in units of the fuel-efficiency-information-collecting sections s1 to sn.

A first fuel-efficiency-change pattern Lfa as a change pattern example shown in FIG. 3(b) is obtained when a vehicle travels the route from the starting point Ps to the destination point Pg by the vehicle operation of the first driver Da. That is, the first fuel-efficiency-change pattern Lfa is a change pattern in which the vehicle operation performed by the first driver Da in connection to fuel-efficiency-influencing factors such as an intersection, a sloped road, and a curve is reflected. Initially, the first fuel-efficiency-change pattern Lfa by the first driver Da is recorded in the control center 200 as the optimal fuel-efficiency-change pattern for the route. In the case of FIG. 3, there is yet only one fuel-efficiency-change pattern for the route. Due to this, as shown in FIG. 3(c), the set section used for calculating the optimal fuel efficiency from the starting point Ps to the destination point Pg is set as one set section D0 based only on the first fuel-efficiency-change pattern Lfa by the first driver Da.

FIG. 4(b) shows a second fuel-efficiency-change pattern Lfb obtained with the vehicle operation by the second driver Db when the second driver Db took the same route as the first driver Da from the starting point Ps to the destination point Pg. In supposing that the control center 200 collected the second fuel-efficiency-change pattern Lfb, the control center 200 compares the second fuel-efficiency-change pattern Lfb with the first fuel-efficiency-change pattern Lfa of the first driver Da, which is the optimal fuel efficiency in the previous cycle, for each of the fuel-efficiency-information-collecting sections s1 to sn.

By such a comparison, a first optimal fuel-efficiency-change pattern Lfm1 shown in FIG. 4(b) by a broken line is obtained. That is, the first optimal fuel-efficiency-change pattern Lfm1 is obtained by sequentially connecting the portion of the first fuel-efficiency-change pattern Lfa by the first driver Da in a first set section D1 between the starting point Ps and a first point Pa, the portion of the second fuel-efficiency-change pattern Lfb by the second driver Db in a second set section D2 between the first point Pa and a second point Pb, and the portion of the first fuel-efficiency-change pattern Lfa by the first driver Da in a third set section D3 between the second point Pb and the destination point Pg. The first optimal fuel-efficiency-change pattern Lfm1 indicates the optimal fuel-efficiency-change pattern in the route from the starting point Ps to the destination point Pg under the respective vehicle operations of the first driver Da and the second driver Db. A first connecting point ch1 of the first optimal fuel-efficiency-change pattern Lfm1 corresponds to the first point Pa in the route that indicates a joint between the first set section D1 and the second set section D2. A second connecting point ch2 of the first optimal fuel-efficiency-change pattern Lfm1 corresponds to the second point Pb in the route that indicates a joint between the second set section D2 and the third set section D3.

Thus, the present embodiment sets the first set section D1 to the third set section D3, which are obtained by dividing the route at the first point Pa and the second point Pb, which are the joints of the first fuel-efficiency-change pattern Lfa of the first driver Da and the second fuel-efficiency-change pattern Lfb of the second driver Db as the sections to be used for the calculation of the optimal fuel efficiency. As has been described in FIGS. 1 and 2, each of the first set section D1 to the third set section D3 is a section that includes the fuel-efficiency-influencing factors such as the intersection and the sloped road, as well as the series of sections that are necessary for performing the energy-efficient driving in connection to the fuel-efficiency-influencing factors.

Further, in the present embodiment, a determination on whether to perform a new section setting at a connection point where the best fuel-efficiency-change pattern switches (a changing point at which a vehicle or a driver that provided vehicle operation data with a high fuel efficiency changes; a joint) is made by using a proximate range-determining value X as shown in FIG. 4(b). That is, the present embodiment does not perform new section setting if the size of a section sectioned by the first connecting point ch1 or the second connecting point ch2 is smaller than the proximate range-determining value X, and performs the new section setting if the aforesaid size is larger than the proximate range-determining value X. Due to this, the set section is prevented from being extremely short. That is, since the section to perform the energy-efficient driving in connection to the fuel-efficiency-influencing factor will be provided with a certain degree of distance, a driver can easily drive with the optimal fuel-efficiency-change pattern as the model. The proximate range-determining value X can be varied in accordance with a traffic environment of the route. The proximate range-determining value X is set, for example, at 50 meters.

In this example, distances T1 to T3 of the respective first set section D1 to third set section D3, which are obtained by dividing route at the first connecting point ch1 and the second connecting point ch2, all exceed the proximate range-determining value X. Thus, the present embodiment fixes the first set section D1 to third set section D3 as set sections for the calculation of the optimal fuel efficiency.

FIG. 5(b) further shows a third fuel-efficiency-change pattern Lfc collected under a vehicle operation by a third driver Dc in a solid line. It is supposed that the third driver Dc has taken the same route as the first driver Da and the second driver Db from the starting point Ps to the destination point Pg. The present embodiment compares the third fuel-efficiency-change pattern Lfc with the first optimal fuel-efficiency-change pattern Lfm1, which is the optimal fuel efficiency in the previous cycle, for each of the fuel-efficiency-information-collecting sections s1 to sn.

FIG. 5(b) shows a second optimal fuel-efficiency-change pattern Lfm2 as a change pattern example in a broken line. The third fuel-efficiency-change pattern Lfc by the third driver Dc exhibits higher fuel efficiency than the first optimal fuel-efficiency-change pattern Lfm1, which is optimal in a fourth set section D4 (FIG. 5(c)) from a third point Pc to a fourth point Pd. Due to this, the present embodiment updates the optimal fuel-efficiency-change pattern in the route from the starting point Ps to the destination point Pg as the second optimal fuel-efficiency-change pattern Lfm2, which partially uses the third fuel-efficiency-change pattern Lfc by the third driver Dc.

However, in this example, a distance T4 of the fourth set section D4 sectioned by the third point Pc and the fourth point Pd is the proximate range-determining value X or less. Thus, the present embodiment does not set the fourth set section D4 as a set section after all, and as shown in FIG. 5(d), integrates a portion of the route corresponding to the fourth set section D4 in the first set section D1, which is positioned immediately before the fourth set section D4 in FIG. 5(c).

Accordingly, the time information for each route is acquired from each of a plurality of vehicles, and the present embodiment suitably connects the portions with the highest fuel efficiency among a plurality of fuel-efficiency-change patterns for each driver. Further, the section setting is suitably performed based on the connection points (joints) of the connected fuel-efficiency-change patterns. Due to this, the optimal fuel-efficiency-change pattern for each route is calculated. Moreover, the route is divided into several predetermined set sections.

When the section setting is performed as above, the present embodiment generates the information related to the vehicle operation necessary for achieving the optimal fuel efficiency in the route, that is, the eco-operation information based on the first set section D1 to the third set section D3, which have been set.

FIG. 6(b) shows a first accelerator position change pattern Lda to a third accelerator position change pattern Ldc, which respectively show change patterns of accelerator position as a change pattern example. The first accelerator position change pattern Lda to the third accelerator position change pattern Ldc are respective change patterns of the accelerator position by the first driver Da to the third driver Dc in the route from the starting point Ps to the destination point Pg, and are substantially inversely proportional to the first fuel-efficiency-change pattern Lfa to the third fuel-efficiency-change pattern Lfc, respectively. That is, it is understood that the first accelerator position change pattern Lda to the third accelerator position change pattern Ldc respectively have a strong correlation with the fuel efficiency. Thus, as an example of the eco-operation information, the present embodiment is supposed to generate information related to the accelerator position when the optimal fuel efficiency is achieved.

As shown in FIGS. 6(b) and 6(c), the generation of the eco-operation information is performed for each of the first set section D1 to the third set section D3, which have been set. FIG. 6(b) shows an optimal accelerator position change pattern Ldm in a broken line. In the first set section D1 and the third set section D3, the first fuel-efficiency-change pattern Lfa by the first driver Da is the best (the lowest among the first set section D1 to the third set section D3 in FIG. 6(b)). Thus, the present embodiment sets portions of the first accelerator position change pattern Lda by the first driver Da in the first set section D1 and the third set section D3 of the eco-operation information. Further, in the second set section D2, the second fuel-efficiency-change pattern Lfb by the second driver Db has been optimal. Thus, the second accelerator position change pattern Ldb by the second driver Db is set in the second set section D2 of the eco-operation information. Accordingly, the optimal accelerator position change pattern Ldm is accelerator position change patterns that have been combined to correspond to the change patterns of the connected optimal fuel efficiencies, and is calculated as the best eco-operation information. Each time the optimal fuel efficiency for the route is updated, the present embodiment suitably updates the eco-operation information in units of the set sections that are set based on the optimal fuel efficiency, based on the fuel efficiency information collected from the vehicles, as information related to the accelerator position when the optimal fuel efficiency is achieved.

FIG. 7 shows a system configuration that implements a section setting method, a fuel efficiency information generation device, and a drive assist device of the present embodiment.

As shown in FIG. 7, the system includes an on-vehicle system 100 installed in a vehicle, and a control center 200, which configures a probe information communicating system. The control center 200 collects and manages the vehicle information (probe information) of the vehicles that travel on a road. The on-vehicle system 100 and the control center 200 correspond to the drive assist device of the present embodiment.

The on-vehicle system 100 includes a vehicle operation information acquiring module 110 for acquiring vehicle operation information that is information related to the driving operation of a vehicle, and a route information acquiring module 120 for acquiring route information related to the position of the system mounting vehicle, routes travelled by the system mounting vehicle, and the like. The on-vehicle system 100 further includes a data receiving device 130, which receives data from the vehicle operation information acquiring module 110 and the route information acquiring module 120, and an on-vehicle controlling device 140, which controls the data receiving device 130 and respective devices that are installed in the vehicle.

The vehicle operation information acquiring module 110 includes various sensors such as an accelerator sensor 111, a brake sensor 112, an acceleration sensor (G sensor) 113, a gyro sensor 114, a steering angle sensor 115, and a vehicle speed sensor 116. The respective sensors 111 to 116 are electrically connected to the data receiving device 130, which aggregates detection results of the various sensors, via an on-vehicle network such as a CAN (Control Area Network), for example.

The accelerator sensor 111 detects the accelerator position, which changes by an accelerator pedal operation by the driver, and sends a signal corresponding to the detected accelerator position to the data receiving device 130. The brake sensor 112 detects presence or absence of a brake pedal operation by the driver, and sends a signal corresponding to the detected presence/absence of operation to the data receiving device 130. The acceleration sensor 113 detects vehicle acceleration, and sends a signal corresponding to the detected acceleration to the data receiving device 130. The gyro sensor 114 detects a vehicle moving direction, and sends a signal corresponding to the detected moving direction to the data receiving device 130. The steering angle sensor 115 calculates the steering angle based on a detected amount of steering angle change, and sends a signal corresponding to the calculated steering angle to the data receiving device 130. The vehicle speed sensor 116 detects a wheel rotating speed, and sends a signal corresponding to the detected rotating speed to the data receiving device 130.

Further, the route information acquiring module 120 includes a GPS 121, a car navigation system 122, a yaw rate sensor 123, the steering angle sensor 115, and the vehicle speed sensor 116.

The GPS 121 receives a GPS satellite signal for detecting an absolute position of the vehicle, detects latitude and longitude of the vehicle based on the received GPS satellite signal, and sends the detected latitude and longitude information of the vehicle to the data receiving device 130.

The car navigation system 122 registers road map data corresponding to a driving area of the vehicle. The road map data is information related to a map, and includes map display data, guide data (names of intersections, names of roads, names of districts, direction guiding facility information), and the like. The map display data is data for displaying the roads and a background of the road map. The guide data is data configured of the names of the intersections and the like, and is used for guiding the driver and the like of a recommended route based on the recommended route. Further, information related to latitude and longitude is registered in such road map data. When the destination point is set by the driver, the car navigation system 122 sends the set latitude and longitude information of the destination point to the data receiving device 130.

The yaw rate sensor 123 detects a yaw rate, which is a change rate of a rotary angle in a turning direction of the vehicle, and sends a signal corresponding to the detected yaw rate to the data receiving device 130 via the on-vehicle network such as the CAN.

The data receiving device 130 sends the received signals to the on-vehicle controlling device 140. The on-vehicle controlling device 140 calculates vehicle operation information that is information related to the vehicle operation by digitizing the driving operation of the vehicle based on the detected results of the respective sensors 111 to 116 acquired via the data receiving device 130. Further, the on-vehicle controlling device 140 calculates route information related to the position of the device mounting vehicle, the routes travelled by the device mounting vehicle and the like based on the information received from the GPS 121, the car navigation system 122, the yaw rate sensor 123, the steering angle sensor 115, and the vehicle speed sensor 116 via the data receiving device 130.

The on-vehicle controlling device 140 includes a fuel efficiency information calculating module 141, which calculates the fuel efficiency of the device mounting vehicle. The fuel efficiency information calculating module 141 calculates the fuel efficiency information of the device mounting vehicle based on a depressed amount of the accelerator pedal, which is based on the detection result of the accelerator sensor 111, and a fuel injection signal and the like input from an engine control device (not shown) and the like. Such various types of information also includes information related to time and the like, at which the various types of information are acquired.

The on-vehicle system 100 further includes a vehicle information recording device 150 and a vehicle radio communication device 160, which respectively are electrically connected to the on-vehicle controlling device 140, an input device 170, a display device 180, and an audio device 190.

The on-vehicle controlling device 140 associates the calculated fuel efficiency information with the vehicle operation information when that fuel efficiency is achieved, and the route information. Further, the on-vehicle controlling device 140 suitably records the various types of information that are associated to one another in the vehicle information recording device 150. Accordingly, the vehicle information recording device 150 stores the vehicle operation information performed by the driver and the fuel efficiency information in the route for the route from the starting point to the destination point. The vehicle information recording device 150 stores a length of the fuel-efficiency-information-collecting section that is the minimum section unit for collecting the route information, the vehicle operation information, and the fuel efficiency information by defining the length for example as 10 meters. That is, the present embodiment records the route information, the vehicle operation information, and the fuel efficiency information for every 10 meters.

The on-vehicle controlling device 140 handles the route information, the vehicle operation information, and the fuel efficiency information stored in the vehicle information recording device 150 as the vehicle information (probe information) of the device mounting vehicle. Further, the on-vehicle controlling device 140 sends the vehicle information of the device mounting vehicle together with a vehicle ID of the device mounting vehicle to the control center 200 via the vehicle radio communication device 160 by using radio transmission. The on-vehicle controlling device 140 performs such transmission of the vehicle information each time the travelling of the vehicle stops, for example.

With the input device 170 being operated by the driver, the setting of the destination point by the driver, and the selected route from the starting point to the destination point are input to the on-vehicle controlling device 140.

The display device 180 displays the plurality of recommended routes from the starting point to the destination point, as well as the information related to the optimal fuel efficiency for each recommended route. The audio device 190 is an output device that outputs various types of information such as a warning related to the drive assistance.

The destination point is set by the driver in the input device 170, and the information related to the set destination point is output to the on-vehicle controlling device 140. The on-vehicle controlling device 140 acquires the latitude and longitude information of the destination point and the latitude and longitude information of the current location from the GPS 121, the car navigation system 122 and the like via the data receiving device 130. When the latitude and longitude information of the destination point and the current location are acquired, the on-vehicle controlling device 140 sends the acquired latitude and longitude information to the control center 200 via the vehicle radio communication device 160 by using radio transmission.

When the setting of the destination point by the driver and the information related to the route selection from the starting point to the destination point are input by the input device 170 being operated by the driver, the on-vehicle controlling device 140 sends the information to the control center 200 via the vehicle radio communication device 160 by using radio transmission.

The display device 180 is configured for example by a liquid crystal display, and is located near a center console in a passenger compartment. Image data for displaying a map, image data for displaying warning for alerting the driver and the like are input to the display device 180 from the on-vehicle controlling device 140, and an image corresponding to the respective image data is displayed. For example, the on-vehicle controlling device 140 outputs the current position of the device mounting vehicle together with the image data that combines the current position with the surrounding map to the display device 180. The display device 180 displays the image in which the position of the device mounting vehicle is combined with the surrounding map. Accordingly, the display device 180 displays a position marker of the device mounting vehicle representing the position of the device mounting vehicle, the route information to the destination point, and the guiding information together with the road map. The display device 180 of the present embodiment displays the information related to the optimal fuel efficiency for each candidate route from the set starting point to the destination point together with the candidate route. Further, the display device 180 displays the eco-operation information each time the vehicle enters each of the first set section D1 to the third set section D3, for example.

The audio device 190 performs alerting the driver and an audio guidance based on a signal received from the on-vehicle controlling device 140. The audio device 190 also informs the driver of the information related to the optimal fuel efficiency and the eco-operation information for each candidate route from the starting point to the destination point.

As shown in FIG. 7, the control center 200 includes a center controlling device 220, which controls various devices, and a center radio communication device 210, a collected information recording device 230, an analyzing device 240, and a guide information calculating module 250, which are electrically connected to the center controlling device 220.

The control center 200 collects the vehicle information of vehicles that respectively install the on-vehicle system 100 from the vehicles. That is, the vehicle information stored by the respective vehicles is input to the center controlling device 220 via the center radio communication device 210. The center controlling device 220 stores the vehicle information that is input from each vehicle in the collected information recording device 230.

The collected information recording device 230 includes a travel data storing module 231, which stores the input vehicle information of each vehicle (each driver), and an optimal fuel efficiency storing module 232. The optimal fuel efficiency storing module 232 records the information related to the optimal fuel-efficiency-change pattern that is obtained as a result of analysis of the vehicle information collected from each vehicle, in units of the set sections that are set based on the change pattern of the optimal fuel efficiency (the first set section D1 to third set section D3 in the example of FIG. 5(d)), for each travel route.

The collected information recording device 230 further includes a section information storing module 233 and an eco-operation information storing module 234. The section information storing module 233 stores information related to set sections calculated based on the result of the analysis of the vehicle information of each vehicle. The eco-operation information storing module 234 records the eco-operation information related to the energy-efficient driving operation calculated based on the result of the analysis of the vehicle information for each vehicle in each set section and each travel route. The collected information recording device 230 also defines the length of the fuel-efficiency-information-collecting section, which is the minimum section unit for collecting the route information, the vehicle operation information, and the fuel efficiency information as 10 meters. That is, the control center 200 of the present embodiment collects and stores the vehicle information for each vehicle for every 10 meters.

Such a collected information recording device 230 reads the vehicle information for each vehicle that is collected and input from the plurality of vehicles into the travel data storing module 231. The travel data storing module 231 stores the fuel efficiency information and the vehicle operation information included in the vehicle information as travel data of each vehicle based on the vehicle ID included in each of the vehicle information. Generally, the same driver drives one particular vehicle in most cases. Thus, the present embodiment handles the vehicle information stored in each vehicle as the vehicle information of each driver based on the vehicle IDs. Accordingly, the travel data storing module 231 stores the vehicle information based on the plurality of types of vehicle operations.

The vehicle information of each driver stored by the travel data storing module 231, that is, the vehicle information of each vehicle is sent to the analyzing device 240. The analyzing device 240 performs analysis of the fuel-efficiency-change patterns of the respective vehicles, section settings for the calculation of the optimal fuel efficiency and the like by using the vehicle information received from the on-vehicle systems 100.

The analyzing device 240 includes a fuel-efficiency-change pattern processing module 241, a section setting module 242 and an operation information processing module 243. The fuel-efficiency-change pattern processing module 241 calculates the fuel-efficiency-change pattern in a route from the starting point to the destination point for each route based on the fuel efficiency information stored in the travel data storing module 231 for each driver. Further, the fuel-efficiency-change pattern processing module 241 compares the fuel-efficiency-change patterns of the routes that are identical or similar in each section, thereby determines portions with the optimal fuel-efficiency-change pattern, and sequentially connects the determined portions with the optimal fuel-efficiency-change patterns.

The section setting module 242 extracts a connection point that is a joint of a plurality of optimal fuel-efficiency-change pattern sections that are connected by the fuel-efficiency-change pattern processing module 241 (in FIG. 5(b), the second connecting point ch2 and the fourth connecting point ch4). The section between these connection points (the first set section D1, the second set section D2, and the third set section D3 in FIG. 5(d)) is set as the set section to be used in the future calculation of the optimal fuel efficiency.

The operation information processing module 243 generates the eco-operation information related to the vehicle operation that is necessary to achieve the optimal fuel efficiency in each route. In the present embodiment, the collected information recording device 230 and the analyzing device 240 correspond to a fuel efficiency information generation device.

When the vehicle information related to each driver is read from the travel data storing module 231 to the analyzing device 240, firstly, the vehicle information is input to the change pattern processing module 241. The fuel-efficiency-change pattern processing module 241 connects the portions with the optimal fuel-efficiency-change patterns for each route (such as the optimal fuel-efficiency-change pattern L3 shown as the change pattern example in FIG. 2(b)) based on the fuel efficiency information change pattern related to each driver stored by the travel data storing module 231 (such as the first fuel-efficiency-change pattern L1 and the second fuel-efficiency-change pattern L2 in FIG. 1(b)). Due to this, the optimal fuel-efficiency-change pattern from the starting point to the destination point is generated for each route.

The section setting module 242 determines the section between the connection points, where the switching of the fuel-efficiency-change pattern occurs, among the optimal fuel-efficiency-change pattern that the fuel-efficiency-change pattern processing module 241 has connected, as the set section to be used in the calculation of the optimal fuel efficiency. The connection points are joints of the fuel efficiency information change patterns obtained based on the vehicle operations by a plurality of drivers.

FIG. 8 shows a proximate range map 242a included in the section setting module 242. The proximate range map 242a records proximate range-determining values X as map data. That is, the proximate range map 242a sets a plurality of proximate range-determining values X1 to X21, for each time range and for each traffic environment element. The traffic environment element is correlated to a magnitude of frequency of which the fuel-efficiency-influencing factors such as intersections, curves and the like are present, such as urban area, suburbs, and highway. That is, the "urban area" has a tendency of high frequency of existence of intersections, curves and the like, and shorter distances between the fuel-efficiency-influencing factors. On the other hand, the "suburbs" and "highway" have a tendency of longer distances between the fuel-efficiency-influencing factors. Further, the traffic environment tends to change depending on the time ranges. Due to this, proximate range-determining values X1 to X7, which are set with the "urban area" as an object, for example, for every six hours during the nighttime and for every three hours during the daytime are set smaller than proximate range-determining values X8 to X14, which are set with the "suburbs" as the object with the same time ranges. Further, the proximate range-determining values X8 to X14 of the "suburbs" are set smaller than X15 to X21 for the "highway". That is, X1<X8<X15, and X2<X9<X16. The proximate range-determining value X is set at a smaller value in a time range with heavier traffic. The proximate range-determining value X is a value that is calculated based for example on the map information registered in the car navigation system 122.

The section setting module 242 selects a proximate range-determining value X from the proximate range map 242a based on the collected route information, and performs resetting and integration of the set sections by using the selected proximate range-determining value X. The section information storing module 233 stores the information related to the set sections set by the section setting module 242 as above together with the relevant location information. The optimal fuel efficiency storing module 232 stores the information related to the optimal fuel-efficiency-change pattern connected by the fuel-efficiency-change pattern processing module 241, together with the relevant location information for each of the set section set by the section setting module 242 and stored by the section information storing module 233.

The operation information processing module 243 combines the vehicle operation information such as the decelerating operation, the accelerating operation, the rightward turning operation, and the leftward turning operation with the optimal fuel efficiency information, which is the information related to the optimal fuel efficiency. The operation information processing module 243 calculates the combined vehicle operation information as the eco-operation information related to the vehicle operation necessary for achieving the optimal fuel efficiency in each route. The eco-operation information storing module 234 stores the eco-operation information for each route together with the relevant location information for each set section.

On the other hand, the guide information calculating module 250 of the control center 200 generates the guide information for assisting the vehicle operation by the driver based on the information sent from the on-vehicle system 100 and related to the starting point (current location) of the vehicle that is an assist target and the destination point.

The guide information calculating module 250 includes a route searching module 251, an optimal fuel efficiency information calculating module 252, and an eco-operation information extracting module 253. The route searching module 251 performs a route search from the starting point to the destination point based on the information related to the destination point sent from the vehicle that is the assist target. The optimal fuel efficiency information calculating module 252 calculates the optimal fuel efficiency information that is the information related to the optimal fuel efficiency capable of being achieved in the route searched by the route searching module 251 based on the optimal fuel-efficiency-change pattern extracted from the optimal fuel efficiency storing module 232. The eco-operation information extracting module 253 extracts the eco-operation information for each route that has been searched by the route searching module 251 from the eco-operation information storing module 234.

When the latitude and longitude information of the starting point and the destination point are received from the vehicle that is the assist target via the center radio communication device 210 and the center controlling device 220, the route searching module 251 performs a route search from the starting point to the destination point based, for example, on a Dijkstra's algorithm. The optimal fuel efficiency information calculating module 252 extracts the optimal fuel-efficiency-change pattern information in the route corresponding to the searched route from the optimal fuel efficiency storing module 232. Next, the optimal fuel efficiency information calculating module 252 calculates the optimal fuel efficiency information for the searched routes by a calculation such as an integration based on the extracted optimal fuel-efficiency-change pattern information. For example, the optimal fuel efficiency information is a required minimum quantity of fuel obtained by integrating the quantity of fuel required to achieve the optimal fuel efficiency for each candidate route from the starting point to a destination point. Accordingly, the guide information calculating module 250 calculates the plurality of candidate routes from the starting point to the destination point, and the optimal fuel efficiency information for each candidate route.

The control center 200 sends the candidate route information as the information calculated in connection to the candidate routes and the optimal fuel efficiency information for each candidate route to the vehicle that is the assist target via the center radio communication device 210. In receiving the sent information via the vehicle radio communication device 160, the on-vehicle controlling device 140 displays the sent information by the display device 180.

When the driver operates the input device 170 to select a route based on the candidate route information and the optimal fuel efficiency information that are displayed, the vehicle radio communication device 160 sends the selected route information as the information related to the selected route to the control center 200. When the selected route information from the vehicle that is the assist target is input, the eco-operation information extracting module 253 of the control center 200 extracts the eco-operation information corresponding to the selected route from the eco-operation information storing module 234. The eco-operation information extracting module 253 sends the extracted eco-operation information to the vehicle that is the assist target via the center radio communication device 210. In so doing, the display device 180 and the audio device 190 of the vehicle outputs the eco-operation information. That is, an image display by the display device 180 and an audio guidance by the audio device 190 for notifying the driver of the eco-operation information is the energy-efficient driving assistance provided to the driver. To provide the energy-efficient driving assistance, the display device 180 and the audio device 190 inform the driver of depressed amounts of the accelerator pedal and the brake pedal, decelerating timing, and accelerating timing based on the eco-operation information when for example the vehicle enters the set section.

The driver can select a route to the destination point based on the plurality of candidate routes and the optimal fuel efficiency information for each candidate route provided together by the on-vehicle system 100. Further, the driver can perform the vehicle operation based on the eco-operation information provided by the on-vehicle system 100 for the selected route.

FIG. 9 shows a functional block diagram of the on-vehicle system 100 and the control center 200. The on-vehicle system 100 performs a first vehicle block BC1 to a seventh vehicle block BC7, and the control center 200 performs a first center block BS1 to a sixth center block BS6. The first vehicle block BC1 to the third vehicle block BC3 and the first center block BS1 to the fourth center block BS4 at an upper half of FIG. 9 show a database generating process. The fourth vehicle block BC4 to the seventh vehicle block BC7 and the fifth center block BS5 to the sixth center block BS6 at a lower half of FIG. 9 show a process of a route setting by the driver.

As shown in FIG. 9, the first vehicle block BC1 of the on-vehicle system 100 acquires the vehicle operation information via the CAN and the like, and outputs the vehicle operation information to the second vehicle block BC2. The third vehicle block BC3 outputs the route information related to the route travelled by the device mounting vehicle, time and date of each travel and the like to the second vehicle block BC2. The second vehicle block BC2 generates and records the fuel-efficiency-change pattern in the route based on the input information. The second vehicle block BC2 records the vehicle operation information on the decelerating operation and the accelerating operation at the time when the fuel-efficiency-change pattern is obtained, together with the fuel-efficiency-change pattern. The second vehicle block BC2 corresponds to the vehicle information recording device 150. The second vehicle blocks BC2 in the respective vehicles that are the assist targets send the recorded fuel-efficiency-change patterns and the vehicle operation information to the control center 200.

The first center block BS1 of the control center 200 compares the fuel-efficiency-change patterns in routes that are identical or similar for each vehicle, that is, for each driver among the fuel-efficiency-change patterns collected from the respective vehicles, and connects the portions of the fuel efficiency information change patterns with which the fuel efficiency becomes optimal. The second center block BS2 performs the section setting to divide the route into a plurality of set sections based on the joints of the portions of the fuel efficiency information change patterns (the changing points where the vehicle and the driver that are the models of the eco-operation change). The second center block BS2 corresponds to the section setting module 242.

The third center block BS3 generates an optimal fuel efficiency database for each set section in each route. That is, the third center block BS3 corresponds to the optimal fuel efficiency storing module 232. The fourth center block BS4 generates a database for the eco-operation information for each set section in each route. That is, the fourth center block BS4 corresponds to the eco-operation information storing module 234.

Accordingly, the on-vehicle system 100 and the control center 200 generate databases related to the fuel efficiency information and the eco-operation information to be provided to the drivers.

When the fourth vehicle block BC4 receives the setting of the destination point from a driver, the fifth center block BS5 calculates a plurality of candidate routes from the starting point to the destination point and the optimal fuel efficiency for each candidate route. The fifth vehicle block BCS5 provides the calculated candidate route and optimal fuel efficiency information for each candidate route to the driver via the display device 180 and the audio device 190. Then, the driver performs the route selection and the route setting based on the several candidate routes provided from the control center 200 and the optimal fuel efficiency information for each of these candidate routes. When the sixth vehicle block BC6 receives the route selection and the route setting, the sixth center block BS6 extracts the eco-operation information corresponding to the set route. The seventh vehicle block BC7 provides the extracted eco-operation information to the driver via the display device 180 and the audio device 190.

Figure 10:
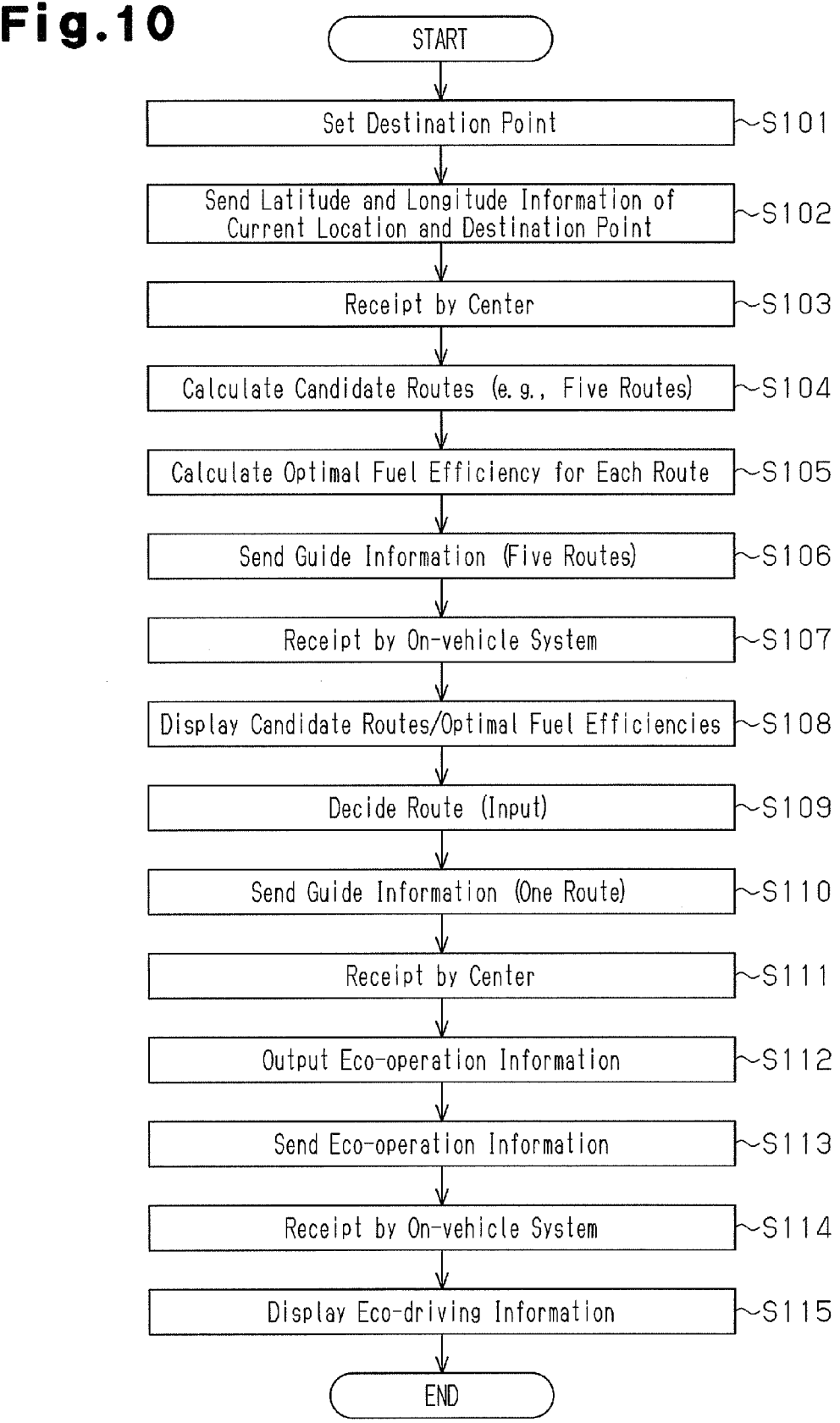
FIG. 10 is a flowchart showing a drive assistance procedure of the embodiment.

FIG. 10 shows a drive assistance procedure by the on-vehicle system 100 and the control center 200.

As shown in FIG. 10, when the destination point is set by the driver (S101), the on-vehicle system 100 sends the latitude and longitude information of both the current location of the vehicle and the destination point to the control center 200 (step S102).

When receiving such information (step S103), the control center 200 performs the route search from the current location of the vehicle to the destination point, and calculates, for example, five patterns of candidate routes (step S104). Further, the control center 200 calculates the optimal fuel efficiency for each candidate route by referencing the optimal fuel efficiency storing module 232 (step S105), and sends the five patterns of candidate routes and the optimal fuel efficiency information for each candidate route to the on-vehicle system 100 as guide information for the driver (step S106).

When the guide information is received (step S107), the on-vehicle system 100 displays the five patterns of candidate routes and the optimal fuel efficiency information for each candidate route on the display device 180 (step S108). When the selected route that the driver has selected is input (step S109), the on-vehicle system 100 sends the selected route information to the control center 200 (step S110). When the selected route information is received (step S111), the control center 200 calculates the eco-operation information for each of the set sections, which are set in the selected route by referencing the eco-operation information storing module 234 (step S112). The control center 200 sends the calculated eco-operation information to the on-vehicle system 100 (step S113).

When the eco-operation information is received (step S114), the on-vehicle system 100 displays the eco-operation information on the display device 180 (step S115). Accordingly, the driver can perform the route selection with the optimal fuel efficiency for each candidate route provided by the control center 200 as an index. Further, the driver can perform the vehicle operation in the selected route in accordance with the eco-operation information that is provided for each set section.

Figure 11:
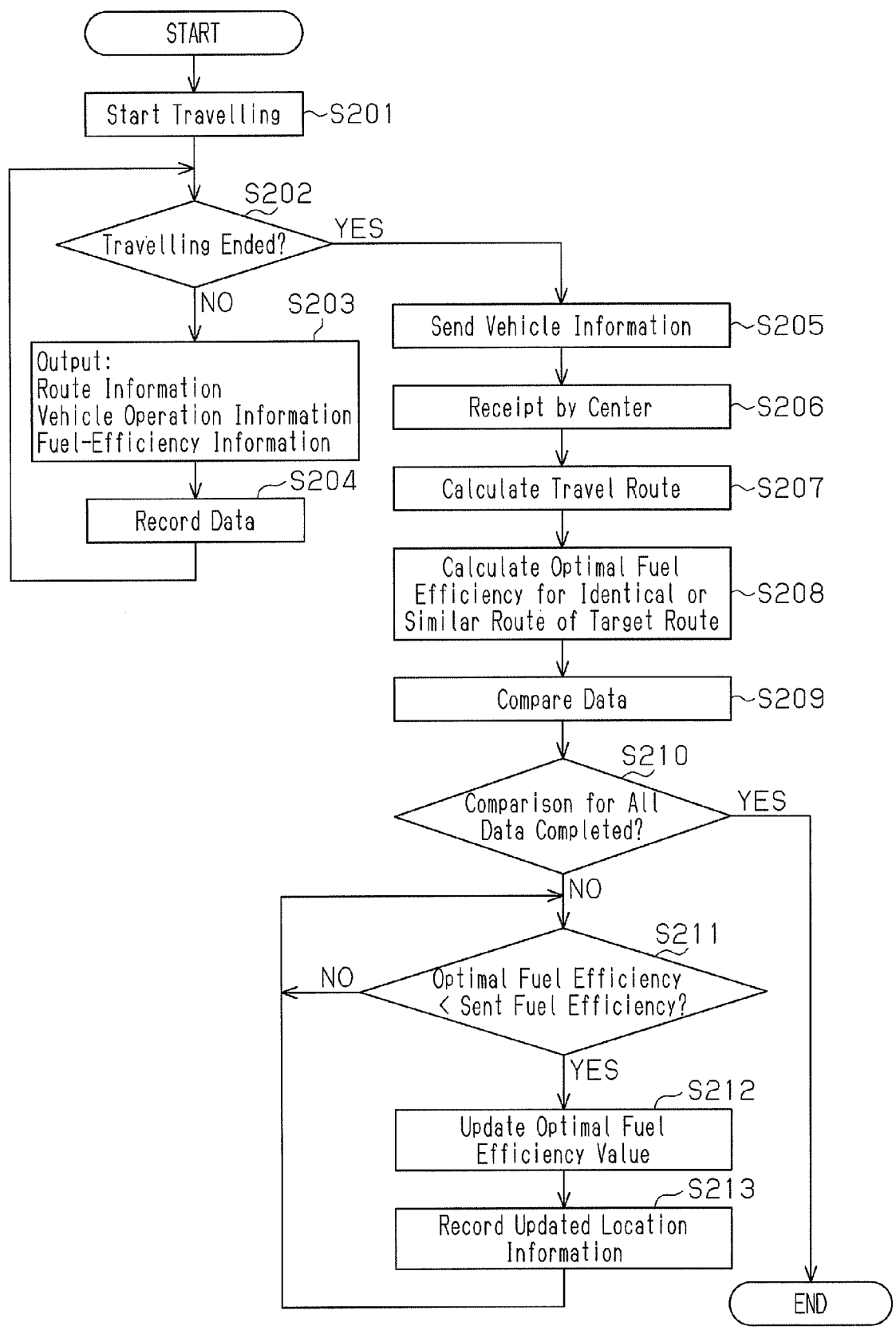
FIG. 11 is a flowchart showing a calculation procedure of an optimal fuel efficiency in a route (travel route) from a starting point to a destination point of the embodiment.

FIG. 11 collectively shows a calculation procedure of the optimal fuel efficiency in a route from the starting point to the destination point.

As shown in FIG. 11, each vehicle starts travelling toward the destination point (step S201). While the travelling continues (step S202: NO), the on-vehicle system 100 suitably calculates the information related to the travel route, the vehicle operation information performed in the route, and the fuel efficiency information in the route (step S203). The vehicle information recording device 150 records the aforementioned information for every 10 meters, for example (step S204). When the vehicle reaches the destination point and ends the travelling (step S202: YES), the on-vehicle system 100 sends the route information, the vehicle operation information performed in the route, and the fuel efficiency information in the route that has been recorded from the starting point until reaching the destination point to the control center 200 as the vehicle information of the device mounting vehicle (step S205).

When receiving such vehicle information (step S206; collection; collecting step), the control center 200 calculates the travel route that each vehicle has travelled based on the route information among the vehicle information (step S207). The control center 200 extracts the information related to the optimal fuel-efficiency-change patterns in the travel route that is identical or similar to the calculated travel route from the optimal fuel efficiency storing module 232 (step S208), and compares the extracted optimal fuel efficiency with the fuel-efficiency-change pattern in the travel route received from the vehicle for each of the fuel-efficiency-information-collecting sections (10 meters) (step S209; comparison; comparing step).

The control center 200 continues comparing the fuel efficiency sent from a vehicle with the optimal fuel efficiency recorded in the optimal fuel efficiency storing module 232 until there is no fuel efficiency (fuel efficiency information) sent from the vehicles (step S210: NO). As a result of the comparison, in a case of determining that the fuel efficiency sent from the vehicle has higher fuel efficiency than the optimal fuel efficiency recorded in the optimal fuel efficiency storing module 232 (step S211: YES), the control center 200 updates the optimal fuel efficiency in the relevant section to the fuel efficiency sent from the vehicle (step S212; connection; connecting step). The control center 200 records information related to an updated position of the optimal fuel efficiency and the updated optimal fuel efficiency information together in the optimal fuel efficiency storing module 232 (step S213). On the other hand, in a case where the fuel efficiency sent from the vehicle is lower than the optimal fuel efficiency recorded in the optimal fuel efficiency storing module 232 (step S211: NO), the control center 200 does not update the optimal fuel efficiency.

Accordingly, the control center 200 calculates the optimal fuel efficiency for each route based on the vehicle information sent from each of the vehicles by comparing all of the fuel efficiency information sent from the vehicles. Each time the vehicle information is collected from a vehicle, the control center 200 performs the above series of processes. Due to this, the control center 200 generates the optimal fuel efficiency information of the section that is the assist target.

Figure 12:
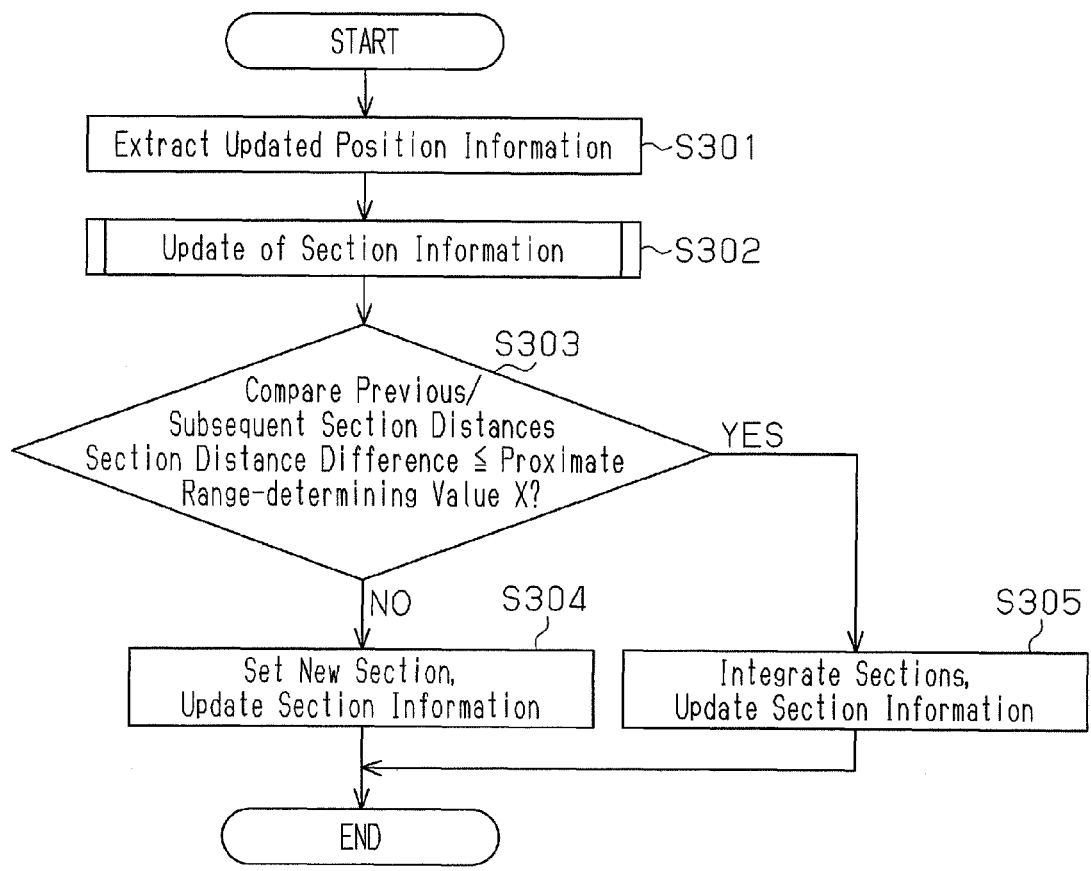
FIG. 12 is a flowchart showing a section setting procedure of the embodiment.

FIG. 12 shows a section setting procedure performed by the section setting module 242 of the control center 200.

As shown in FIG. 12, when the location information indicating the location where the optimal fuel efficiency has been updated as described in preceding step S213 in FIG. 11 is extracted (step S301), the section setting module 242 performs a resetting process for updating the set sections for calculating the optimal fuel efficiency (step S302; setting of determination value; determination value setting step). Initially, the section setting module 242 determines whether an updated section in which the optimal fuel efficiency has been updated is within a proximate range indicated by the proximate range-determining value X with respect to the set section that is set immediately before or after the updated section (step S303). That is, step S303 determines whether an interval of a pair of set sections that sandwich the newly updated section, that is, the distance between the set section that is set immediately before the updated section and the set section that is set immediately after is smaller than the proximate range-determining value X.

In a case where the updated section in which the optimal fuel efficiency has been updated is larger than the interval between the pair of set sections immediately before and after the updated section (step S303: NO), the section setting module 242 sets the updated section in which the optimal fuel efficiency has been updated as the new set section (step S304; section setting step; fixing step). On the other hand, in a case where the updated section in which the optimal fuel efficiency has been updated is equal to or smaller than the interval between the pair of set sections immediately before and after the updated section (step S303: YES), the section setting module 242 integrates the updated section to the set section immediately before the updated section (step S305; integrating step). Notably, the updated section may be integrated to the section that is immediately after.

Accordingly, the section setting module 242 suitably updates the information related to the set sections. The control center 200 also updates the eco-operation information of the set section that is newly set. As above, the control center 200 suitably updates the various types of information recorded in the section information storing module 233 and the eco-operation information storing module 234.

As described above, the section setting method, the fuel efficiency information generation device, and the drive assist device according to the first embodiment achieve the following advantages.

(1) The present embodiment collects the fuel efficiency information for each route from a plurality of vehicles, and compares the change patterns in the respective fuel efficiency information that has been collected, for each portion. The present embodiment sequentially connects the portions with which the fuel efficiency becomes optimal among the fuel efficiency information change pattern from the starting point to a destination point. The route is divided at the connection points (joints) of the connected change pattern sections of the fuel efficiency information with the optimal fuel efficiency. The route portions between these points are set as the sections to be used for the calculation of the optimal fuel efficiency. Due to this, the sections in which the series of vehicle operation that is economically excellent in the fuel-efficiency-influencing factors such as the intersection and the sloped road are set as the section units. In calculating the fuel efficiency based on the sections set as above, the optimal fuel efficiency that can be achieved in the respective route from the starting point to the destination point can be calculated.

(2) The present embodiment calculates the optimal fuel efficiency for each route based on the information related to the optimal fuel-efficiency-change pattern connected for each set section. Due to this, in each route from the starting point to the destination point, the fuel efficiency information can be calculated by combining the portions with the optimal fuel efficiency among the fuel-efficiency-change patterns obtained by the plurality of types of vehicle information. Thus, even in the case where the fuel-efficiency-change pattern for each route differs due to the driving techniques and habits of the drivers, the optimal fuel efficiency information that can be achieved can be calculated.

(3) The present embodiment collects the fuel efficiency information for each of the fuel-efficiency-information-collecting sections, which is the minimum section unit for the collection, and connects the change pattern sections with the fuel efficiency information in which the fuel efficiency from the starting point to the destination point become optimal by the comparison of the fuel efficiency information in the fuel-efficiency-information-collecting sections. Due to this, the set sections are set in a manner in which the section units such as 10 meters as previously defined in the control center 200 are suitably combined. Due to this, the setting of the sections based on the fuel efficiency information collectively collected in the control center 200 can be performed accurately. That is, practicability as the section setting method is further improved. Moreover, the control center 200 compares the change pattern sections of the fuel efficiency information in the minimum section units by which the fuel efficiency information can be collected, and connects the change pattern sections with the optimal fuel efficiency information. Thus, the section setting in which the vehicle operations performed in connection to the fuel-efficiency-influencing factors are reflected can be performed with higher precision. Due to this, the calculation of the optimal fuel efficiency for each route and the calculation of the eco-operation information can be performed with higher precision.

(4) The present embodiment determines the proximate range-determining value X, which defines whether the new update section, which is set based on the connection points to update the optimal fuel efficiency, is within the proximate range of the existing previous and subsequent set sections. Further, the update section within the proximate range is integrated to one of the previous and subsequent set sections based on the determination result based on the proximate range-determining value X, and the update section outside the proximate range is fixed as the new set section. Due to this, in performing the section setting based on the connection points of the connections of the change pattern sections of the fuel efficiency information collected from the plurality of vehicles, set sections with an ensured certain length that are not excessively short are set. Due to this, the set sections are not excessively subdivided, and the section setting suitable for the vehicle driving circumstance can be performed.

(5) Further, especially, in the case where at least one of the lengths of the update section immediately before the connection point and the update section immediately after is the proximate range-determining value X or less, the present embodiment integrates the previous and subsequent sections as one section. This reduces the likeliness of the route being divided at the position of the fuel-efficiency-influencing factor such as the intersection. The present embodiment can easily implement the section setting that sufficiently encompasses the fuel-efficiency-influencing factors and the sections necessary for performing the series of vehicle operations in connection to the fuel-efficiency-influencing factors. This leads to a smooth and reasonable vehicle operation for the energy-efficient driving.

(6) The present embodiment configures the proximate range-determining value X to be variable depending on the traffic environment. Due to this, in a driving area with highly frequent fuel-efficiency-influencing factors and short distances between the fuel-efficiency-influencing factors such as the urban area, the proximate range-determining value X is correspondingly set to a small value. Thus, finely set sections suitable for the traffic environment of the urban area are set. On the other hand, a driving area with less frequent fuel-efficiency-influencing factors and long distances between the fuel-efficiency-influencing factors such as the suburbs and highway, the proximate range-determining value X is correspondingly set to a large value. Thus, the route from the starting point to the destination point is prevented from being unnecessarily subdivided. Due to this, the set sections suitable for the traffic environment can be set. That is, the practicability of the section setting method, the fuel efficiency information generation device, and the drive assist device can be improved.

(7) The present embodiment acquires the fuel efficiency information from each vehicle, and performs the section setting for each vehicle. Due to this, in collecting the vehicle information from the plurality of vehicles, the vehicle information can easily be managed based on the vehicle IDs.

(8) Generally, the vehicle information collected from each vehicle is information related to a fixed driver such as the user of the vehicle. The present embodiment can handle the vehicle information collected from each vehicle by regarding the vehicle information as the vehicle information inherent to each driver. Due to this, the connections of the change pattern sections of the fuel efficiency information can be performed for each driver. Further, the section setting can be performed for each driver. Due to this, relevance of the vehicle operation that achieves the optimal fuel efficiency and the set section is increased. Thus, the eco-operation information generated in each set section can be treated as the information in which the series of operation information of each driver is reflected.

(9) The present embodiment generates and stores, for each section, the eco-operation information when the optimal fuel efficiency is achieved. Further, the stored eco-operation information is provided in the vehicle that is the assist target. As a result, the optimal fuel efficiency information from the starting point to the destination point is provided to the driver, and at the same time, the vehicle operation information necessary for achieving the optimal fuel efficiency can be provided. Due to this, possibility of achieving the connected optimal fuel efficiency is favorably increased.

(10) The on-vehicle system 100 of the present embodiment includes the display device 180, which displays the fuel efficiency information. The display device 180 is configured to display the information related to the optimal fuel efficiency for each of the searched routed searched from the current location to the destination point. Due to this, the candidate routes from the starting point to the destination point and the optimal fuel efficiency information for each candidate route can be provided by the display device configuring a known car navigation system and the like.

(11) The control center 200 of the probe information communicating system of the present embodiment is configured to calculate the guide information based on the respective vehicle information obtained by the radio communication function from the plurality of vehicles travelling the same section. The control center 200 is configured to provide the calculated guide information to the vehicle responsive to a request from the on-vehicle system 100. Due to this, the present embodiment is capable of easily acquiring various types of information necessary for the section setting and the calculation of the optimal fuel efficiency from the vehicles actually travelling on the road. Further, the control center 200 can collectively perform the collection of the vehicle information, the setting of the sections based on the vehicle information, the generation of the various types of information for the set sections, and the distribution thereof.

(12) The on-vehicle system 100 of the present embodiment can acquire the route searching information in each section and the optimal fuel efficiency information for each of the searched routes by requesting via the vehicle radio communication device 160. Thus, the energy-efficient driving assistance is achieved based on minimum amounts of calculation and information.

Figure 13:
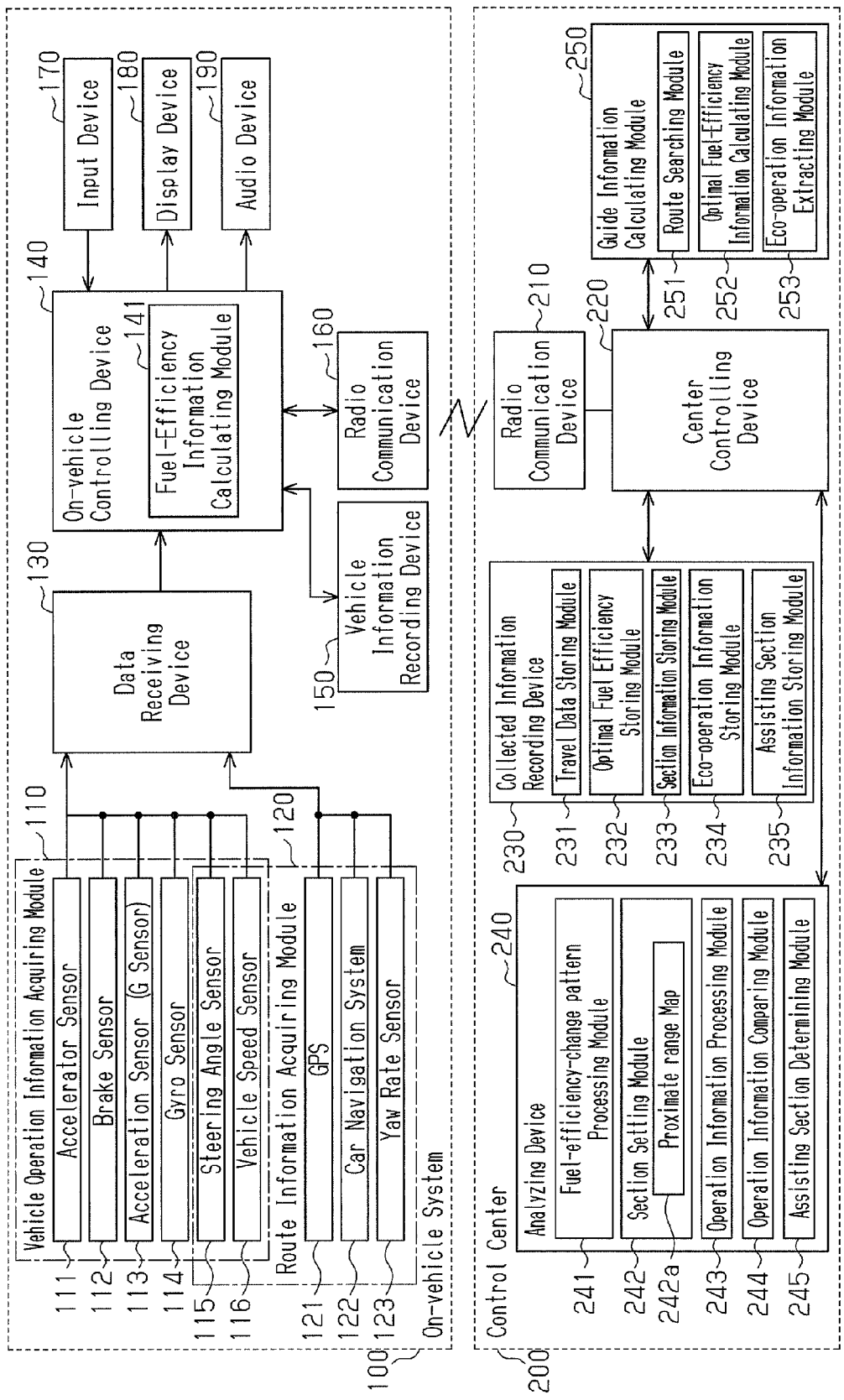
FIG. 13 is a block diagram showing a conceptual diagram of a system in which a section setting method, a fuel efficiency information generation device, and a drive assist device of a second embodiment of the present invention.

FIGS. 13 and 14 illustrate a section setting method, a fuel efficiency information generation device, and a drive assist device according to a second embodiment of the present invention. The second embodiment generates guide information by comparing a vehicle operation by a driver to eco-operation information. The configuration of a control center 200 of the second embodiment is changed from that of the first embodiment as above, and other configurations are in common with the first embodiment as above. In the drawings, the same elements are given the same signs, and overlapping description will be omitted.

FIG. 13 shows an on-vehicle system 100 and the control center 200, which are used in the section setting method, the fuel efficiency information generation device, and the drive assist device of the second embodiment as a corresponding drawing of FIG. 7 as above.

As shown in FIG. 13, an analyzing device 240 of the control center 200 of the present embodiment additionally includes an operation information comparing module 244 and an assist section determining module 245. A collected information recording device 230 additionally includes an assist section information storing module 235.

The operation information comparing module 244 compares vehicle operation information for each driver with eco-operation information stored in an eco-operation information storing module 234. Based on a comparison result by the operation information comparing module 244, the assist section determining module 245 determines a section that is especially in need of the co-operation information for the driver, that is, an assist section. The assist section information storing module 235 stores information related to the section determined by the assist section determining module 245 for each driver (each vehicle).

When the control center 200 collects a plurality of pieces of vehicle information and performs section setting, generation of the eco-operation information and the like, the operation information comparing module 244 compares the vehicle operation information stored in the travel data storing module 231 for each driver with the eco-operation information stored in the eco-operation information storing module 234 for each set section stored in the section information storing module 233. For example, the operation information comparing module 244 compares accelerator positions of the respective drivers in a certain travel route with an accelerator position included in the eco-operation information, for each set section. The comparison based on such an accelerator position is performed for example based on a comparison of average values, maximum values, or minimum values of the accelerator positions for each set section, or a comparison of calculation results by integration.

That is, based on the comparison result of the operation information comparing module 244, a section in which difference in the accelerator positions becomes largest in the certain travel route is identified. That is, the control center 200 determines a section in which accelerator pedaling amounts by the drivers are excessively large as the assist section in which the drive assistance for the respective drivers is necessary. Accordingly, when the operation information comparing module 244 determines the assist sections, in which the drive assistance is necessary for each driver, the assist section information storing module 235 stores the information related to the determined assist sections for driver (each vehicle).

When selected route information by the driver is acquired from the on-vehicle system 100 via radio communication, the eco-operation information extracting module 253 extracts the information related to the assist section, in which the eco-operation information needs to be provided, in the candidate routes from the assist section information storing module 235. Further, the eco-operation information extracting module 253 extracts the eco-operation information related to the extracted assist section from the eco-operation information storing module 234. The eco-operation information extracting module 253 sends the information related to the assist section and the eco-operation information of the extracted assist section that are respectively extracted to the on-vehicle system 100 via the radio communication as the guide information for the vehicle that is the assist target.

When the guide information sent via the radio communication from the control center 200 is received and the vehicle enters the assist section, the display device 180 and the audio device 190 notifies the driver of the eco-operation information in the assist section by image display and audio guidance. The driver can thereby perform the vehicle operation such as an adjustment of an accelerator position in connection to a fuel-efficiency-influencing factor such as an intersection in accordance with the guidance. Thus, an improvement in the fuel efficiency in the assist section is effectively achieved. The on-vehicle system 100 also sends the vehicle operation information by the driver in the travel route as above to the control center 200, and causes the travel data storing module 231 to suitably store the vehicle operation information.

Accordingly, the control center 200 recursively performs:

a) calculation of a difference by comparison of vehicle information by the driver in the travel route and the eco-operation information;

b) determination of the set section in which the difference becomes maximum in the travel route; and c) provision of the eco-operation information for the determined set section.

Due to this, only the most effective eco-operation information can be provided to the driver. That is, the drive assistance according to the driving technique of each driver can be achieved in a stepwise manner.

Figure 14A:
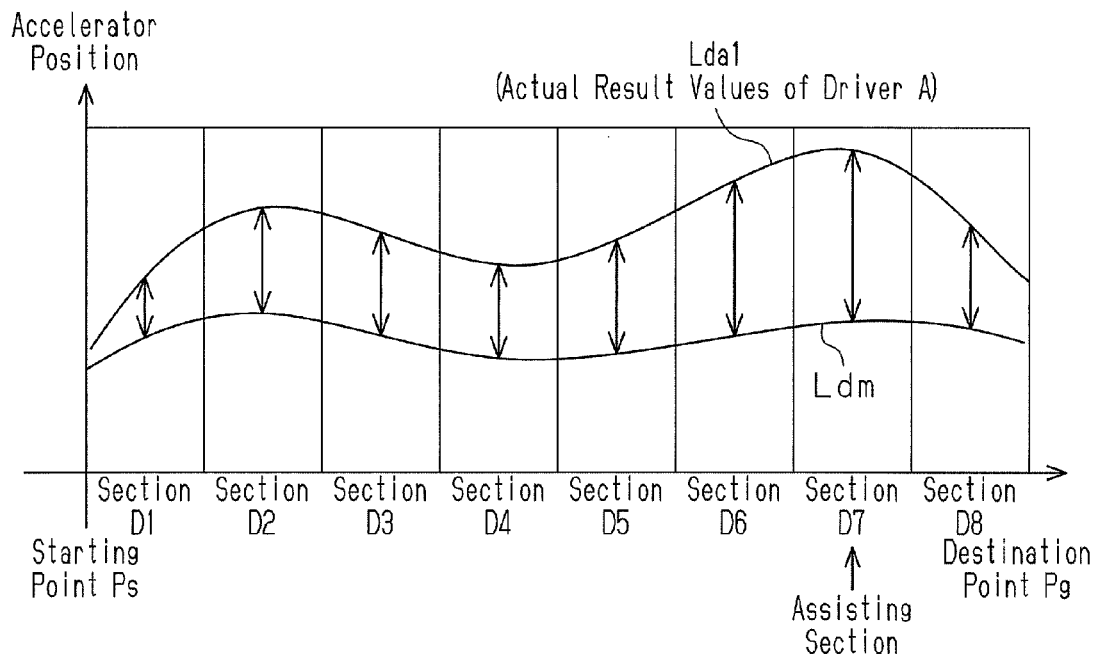
FIGS. 14(a) and 14(b) are diagrams showing modes for determining drive assistance sections of the embodiment.
Figure 14B:
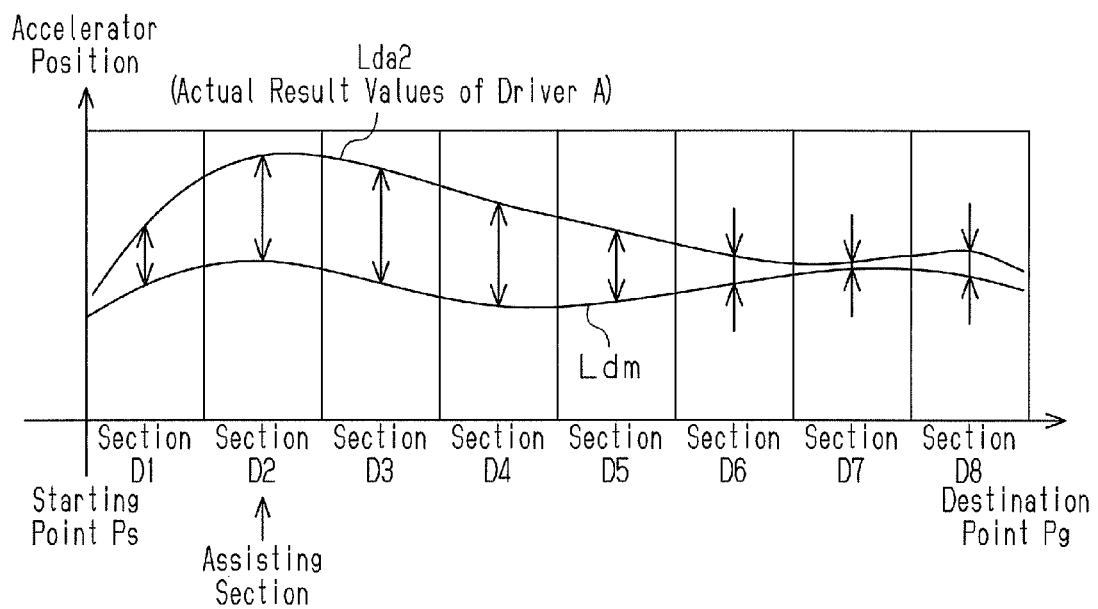

FIG. 14 shows a mode of determining the assist section. In FIGS. 14(*a*) and 14(*b*), a first accelerator position change pattern Lda1 as a change pattern example shows an accelerator position change pattern of a certain first driver A in a travel route. In FIGS. 14(a) and 14(b), an optimal accelerator position change pattern Ldm as a change pattern example shows a case in which optimal energy-efficient driving is performed in the travel route. These change patterns are information obtained from the information stored in the travel data storing module 231 and the eco-operation information storing module 234, and a first set section D1 to an eighth set section D8 are set sections that are set based on the section setting method of the present embodiment.

As shown in FIG. 14(a), in the route from a starting point Ps to a destination point Pg, the first accelerator position change pattern Lda1 by the first driver A in the first set section D1 to the eighth set section D8 is at the maximum in the seventh set section D7, and the difference from the optimal accelerator position change pattern Ldm is also at the maximum in the seventh set section D7. Thus, the present embodiment defines the seventh set section D7 as the assist section, for which provision of the eco-operation information to the first driver A is most effective. When the first driver A travels on the same route or a similar route, the on-vehicle system 100 and the control center 200 provide the eco-operation information such as the accelerator position in the seventh set section D7 when the vehicle enters the seventh set section D7.

As a result, as shown in FIG. 14(b), a corrected accelerator position change pattern Lda2 is obtained by the first driver A performing the vehicle operation in accordance with the eco-operation information provided in the seventh set section D7. As can be understood from FIG. 14(b), the corrected accelerator position change pattern Lda2 is similar to the optimal accelerator position change pattern Ldm in the seventh set section D7. The corrected accelerator position change pattern Lda2 is maximum in the second set section D2, and the difference from the optimal accelerator position change pattern Ldm is also maximum in the second set section D2. Thus, the control center 200 defines the second set section D2 as the assist section, for which eco-operation information should be provided. When the first driver A travels on the same route or a similar route, the on-vehicle system 100 and the control center 200 provide the eco-operation information in the second set section D2 when the vehicle enters the second set section D2.

As described above, according to the section setting method, the fuel efficiency information generation device, and the drive assist device of the second embodiment, following advantages are further achieved together with the advantages of above (1) to (12).

(13) The present embodiment compares the vehicle operation of the driver who is the assist target with the eco-operation information for each set section. By so doing, the section with the maximum difference therebetween is defined as the assist section. Then, the eco-operation information in the determined assist section is configured to be provided to the driver. Due to this, only the eco-operation information in the section in which the improvement of the fuel efficiency can be expected at most in the respective routes for each driver can precisely be provided.

(14) The present embodiment is configured to recursively perform the determination of the assist section for which provision of the eco-operation information is necessary, and the provision of the eco-operation information in the assist section. Due to this, the drive assistance according to the driving technique of the driver can be performed in a stepwise manner, and the practicability of the drive assistance can be increased. Further, due to this, the drive assistance by the provision of the required minimum eco-operation information is performed. The driver can improve his/her energy-efficient driving technique in small steps without encountering a hardship.

The above described embodiments may be modified as follows.

Figure 15:
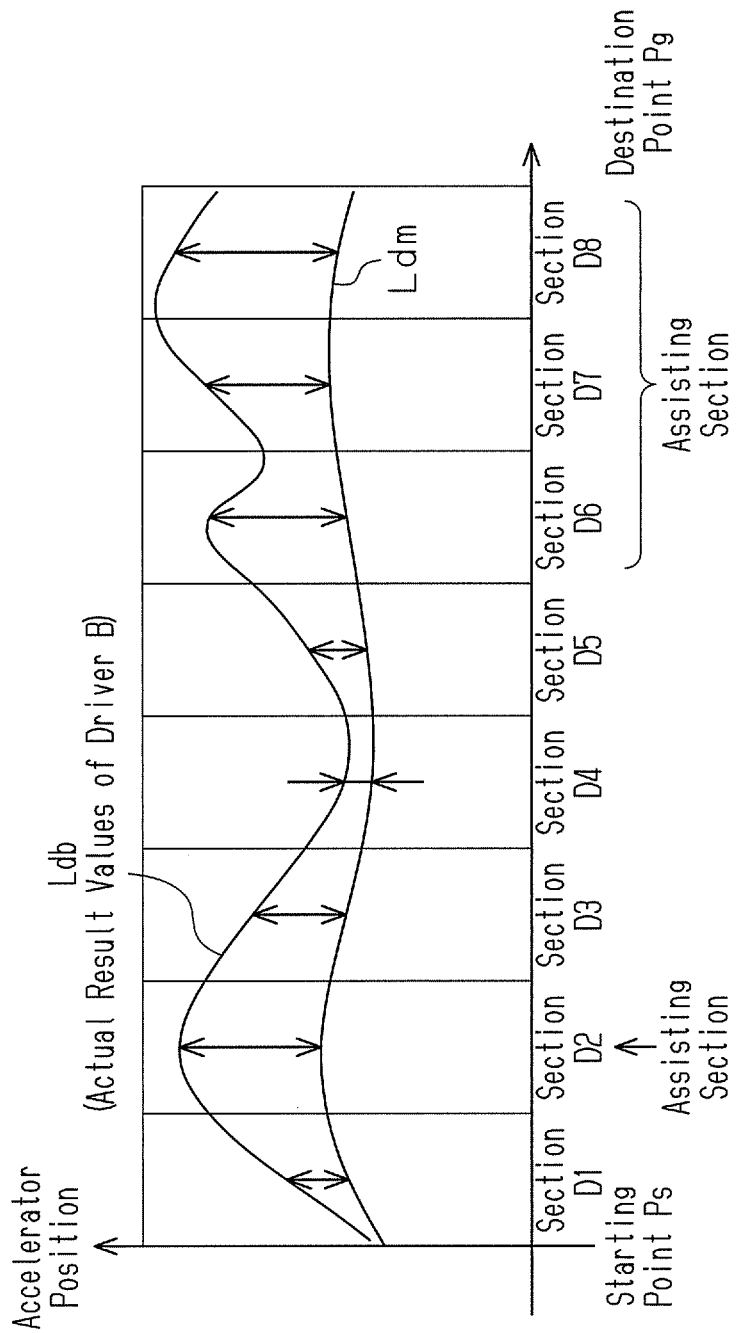
FIG. 15 is a diagram showing modes for determining drive assistance sections of another embodiment of a section setting method, a fuel efficiency information generation device, and a drive assist device of the present invention.

The second embodiment is not limited to determining the section in which the difference in the set section between the vehicle operation by the driver who is the assist target and the eco-operation information becomes maximum as the assist section, and may be configured to determine the section in which the difference comes to be a predetermined threshold or more as the assist section. FIG. 15 shows a diagram corresponding to FIG. 14 as above. As a change pattern example, a second accelerator position change pattern Ldb upon travelling the route from the starting point Ps to the destination point Pg is shown. A value that corresponds to 20% of the optimal accelerator position change pattern Ldm is set as the difference threshold value. The control center 200 compares the second accelerator position change pattern Ldb by the second driver B with the optimal accelerator position change pattern Ldm for each of the first set section D1 to the eighth set section D8. As a result of the comparison, for example in the second set section D2 and the sixth set section D6 to the eighth set section D8, the control center 200 determines that the second accelerator position change pattern Ldb is the optimal accelerator position change pattern Ldm or greater by 20%. That is, the control center 200 determines the second set section D2 and the sixth set section D6 to the eighth set section D8 as the assist section for which the eco-operation information should be provided to the second driver B.

Thus, in cases where the vehicle that the second driver B is driving travels in the same route or a similar route that includes the second set section D2 and the sixth set section D6 to the eighth set section D8, the control center 200 provides the relevant eco-operation information each time the vehicle enters the second set section D2 and the sixth set section D6 to the eighth set section D8, respectively. As in the second accelerator position change pattern Ldb shown in FIG. 15, even in the case where a variation in the second accelerator position change pattern Ldb in the route is large, the eco-operation information can be provided in accordance with the variation. In such cases also, precise drive assistance according to the driver's driving technique can be performed.

In the second embodiment, the vehicle operation that is the target of comparison is not limited to the accelerator position, but may be any vehicle operation that influences the fuel efficiency such as a brake depressed amount, a rightward turning operation, or a leftward turning operation. Further, the eco-operation information related to the vehicle operation of the target of comparison is provided to the driver.

In the first embodiment, a timing at which the eco-operation information of the set section is to be provided to the driver is not limited to when the vehicle enters the set section, but the eco-operation information of the set section may be provided to the driver in a section that is before reaching the set section. In the second embodiment, the timing at which the eco-operation information of the set section is to be provided to the driver is not limited to when the vehicle enters the set section, but the eco-operation information of the set section may be provided to the driver in a section that is before reaching the set section. In brief, the timing at which the eco-operation information is to be provided to the driver will suffice so long as it is a timing by which an improvement in the fuel efficiency can be expected by providing the eco-operation information to the driver.

In the respective embodiments, the guide information to be provided to the driver is not limited to the optimal fuel efficiency for each candidate route and the eco-operation information in the relevant sections. Only the optimal fuel efficiency for each candidate route may be provided to the driver. In this case also, the driver can perform the route selection from the starting point to the destination point with the optimal fuel efficiency for each candidate route as the index.

In the respective embodiments, what the on-vehicle system 100 includes for providing the eco-operation information to the driver is not limited to the display device 180 and the audio device 190, but may be only one of the above.

When integrating the updated section to the set section positioned immediately before when the distance of the updated section divided by the connection points is the proximate range-determining value X or less, as shown in FIG. 5, the respective embodiments are not limited to updating the optimal fuel-efficiency-change pattern in the updated section. That is, the updated section may be integrated in the set section, and the optimal fuel-efficiency-change pattern does not necessarily have to be updated after all. FIG. 5(*b*) shows the first optimal fuel-efficiency-change pattern Lfm1 in the fourth set section D4 as an example of the optimal fuel-efficiency-change pattern that is not updated after all. In this case, relevance of the set sections that are respectively set and the driver can further be increased. That is, optimal fuel efficiency with high feasibility is calculated.

In the respective embodiments, an object to which the guide information generated in the control center 200 is provided is not limited to the vehicle that is the assist target. The guide information may be provided to a smartphone, or various types of communication terminals via a communication medium such as the Internet from the control center 200.

In the respective embodiments, the control center 200, to which the vehicle information (probe information) from the vehicle is transmitted and in which the section setting and the various types of calculations are performed, is located outside the vehicle. However, no limitation is made hereto, and the control center 200 may be installed in the respective vehicles by using a communication system such as a communication between vehicles or a communication between a road and a vehicle, for example. The control center 200 will suffice so long as it is capable of collecting the fuel efficiency information based on the plurality of types of vehicle operations, and performing the section setting based on the collected fuel efficiency information.

The respective embodiments are not limited to integrating the update section that is the proximate range-determining value X or less to the set section positioned immediately before the updated section, but may integrate the update section to the set section positioned immediately after the updated section.

The respective embodiments are not limited to making the proximate range-determining value X to be variable depending on the traffic environment, but may have it fixed. In this case also, the magnitude of the proximate range-determining value X is preferably set to a value that can sufficiently encompass a section in which the series of vehicle operation that is performed in connection to intersections, curves and the like is performed.

As a further alternative, the determination on the need of the section setting based on the proximate range-determining value X does not necessarily have to be performed. That is, all of the updated sections obtained by the divisions at the connection points (joints) do not have to be integrated, and may be set as they are as the set sections for the calculation of the optimal fuel efficiency.

In the respective embodiments, the fuel-efficiency-information-collecting sections are not limited to being set to 10 meters, but may be set to any value such as 5 meters, or 20 meters. It is preferable to set the fuel-efficiency-information-collecting sections to a small value such as a few meters in order to collect highly precise fuel efficiency information. Further, consecutive fuel-efficiency-information-collecting sections may be combined at a predetermined number, and may be configured as one unit of section. That is, the comparison of the fuel efficiency information may be performed in larger fuel-efficiency-information-collecting sections, and the change pattern sections of the optimal fuel efficiency information may be connected by such a comparison.

The respective embodiments are not limited to using the fuel efficiency information provided by the plurality of vehicles (drivers) in collecting the fuel efficiency information based on the plurality of types of vehicle operations. In a case where fuel efficiency information with fuel-efficiency-change patterns that are different each time in the same or similar routes can be collected despite those being of the same driver, the setting of the sections may be performed based only on the change patterns in the fuel efficiency information collected from the same driver. In brief, the fuel efficiency information obtained in a route from a certain starting point to a destination point will suffice so long as it is obtained from the plurality of types of vehicle operations.

In the respective embodiments, the optimal fuel efficiency information as the guide information to be provided to the driver is not limited to the minimum required quantity of fuel that is a result of an integration of the quantity of fuel necessary for achieving the optimal fuel efficiency from the starting point to a destination point for each candidate route. The optimal fuel efficiency information as the guide information may be information related to average fuel efficiency for each candidate route obtained by dividing the distance of the candidate route by the minimum required quantity of fuel for the candidate route, respectively. In brief, the guide information will suffice so long as it is information generated based on the fuel-efficiency-change pattern in which the fuel-efficiency-change pattern sections based on the plurality of types of vehicle operations are connected.

In the respective embodiments, the optimal fuel efficiency information for the candidate routes, that is, the information related to the fuel efficiency that is required from the starting point to the destination point when the respective candidate routes are travelled under the optimal energy-efficient driving is provided as the guide information. Other than the above, the fuel-efficiency-change patterns in the candidate routes may be averaged, and information related to the average fuel efficiency that has been averaged may be provided as the guide information for each candidate route. In brief, the guide information provided to the driver will suffice so long as it is information generated based on the fuel-efficiency-change patterns in which the fuel-efficiency-change patterns based on the plurality of types of vehicle operations are connected.

In the connections in the respective embodiments, the change pattern sections, which are parts of the change patterns, are sequentially connected from the starting point to the destination point based on the result of the comparison so that the fuel efficiency from the starting point to the destination point is optimized. Further, in the above setting of the sections, the section divided at the positions corresponding to the connection points of the connected change pattern sections is set as the section to be used for the calculation of the optimal fuel efficiency. No limitation is made hereto, and in the above connections, the change pattern sections, which are parts of the change patterns, may be sequentially connected from the starting point to the destination point based on the result of the comparison so that the fuel efficiency from the starting point to the destination point is minimized. Further, in the above setting of the sections, the section divided at the positions corresponding to the connection points of the connected change pattern sections may be set as the section to be used for the calculation of the minimum fuel efficiency. In this case, a section in which a certain driver has performed a series of least economical vehicle operations under a certain fuel-efficiency-influencing factor is set as one of a plurality of section units, which are obtained by dividing the route from the starting point to the destination point. That is, by calculating the fuel efficiency based on such set sections, the minimum fuel efficiency that is expected when the vehicle operation with the lowest economical efficiency is performed can be calculated for each of the route from the starting point to the destination point. Further, the information related to the minimum fuel efficiency calculated as above, and the vehicle operation information included in the change pattern sections configuring the aforesaid information may be provided as the guide information to the driver via the display device 180 and the audio device 190. In this case, by providing the route information with which the low economical vehicle operation tends to be performed and the minimum fuel efficiency information in that route to the driver, the low economical route can selectively be avoided.

Further, for example, the minimum fuel efficiency and the optimal fuel efficiency for each route may be compared and displayed on the display device 180. In this case, a route selection through the comparison of the minimum fuel efficiency and the optimal fuel efficiency for each route becomes possible, and a degree of freedom in the route selection can be increased.

DESCRIPTION OF THE REFERENCE NUMERALS

100 . . . on-vehicle system, 110 . . . vehicle operation information acquiring module, 111 . . . accelerator sensor, 112 . . . brake sensor, 113 . . . acceleration sensor, 114 . . . gyro sensor, 115 . . . steering angle sensor, 116 . . . vehicle speed sensor, 120 . . . route information acquiring module, 121 . . . GPS, 122 . . . car navigation system, 123 . . . yaw rate sensor, 130 . . . data receiving device, 140 . . . on-vehicle controlling device, 141 . . . fuel efficiency information calculating module, 150 . . . information recording device, 160 . . . radio communication device (vehicle), 170 . . . input device, 180 . . . display device, 190 . . . audio device, 200 . . . control center, 210 . . . radio communication device (center), 220 . . . center controlling device, 230 . . . collected information recording device, 231 . . . travel data storing module, 232 . . . optimal fuel efficiency storing module, 233 . . . section information storing module, 234 . . . eco-operation information storing module, 235 . . . assist section information storing module, 240 . . . analyzing device, 241 . . . fuel-efficiency-change pattern processing module, 242 . . . section setting module, 242*a* . . . proximate range map, 243 . . . operation information processing module, 244 . . . operation information comparing module, 245 . . . assist section determining module, 250 . . . guide information calculating module, 251 . . . route searching module, 252 . . . optimal fuel efficiency information calculating module, 253 . . . eco-operation information extracting module, A1 . . . intersection, A2 . . . curve, AS . . . traffic light, C1, C2 . . . vehicle, s1 to s*n* . . . fuel-efficiency-information-collecting section.

The invention claimed is:

1. A section setting method comprising:

collecting fuel efficiency information with a processor, which is information related to fuel efficiency of a vehicle that travels along a single path from a starting point to a destination point and is obtained under a plurality of types of vehicle operations together with location information of the vehicle at each time;

forming a plurality of change patterns wherein each change pattern contains the collected fuel efficiency information of the vehicle that travels along the single path from the starting point to the destination point;

comparing change patterns in the collected fuel efficiency information for each of the location information;

connecting change pattern sections, which are parts of the change patterns, sequentially from the starting point to the destination point based on a result of the comparison;

setting, as a section to be used for calculation of actual fuel efficiency, a section that is obtained by dividing a route at positions corresponding to connection points of the connected change pattern sections using a fuel-efficiency generation device;

setting a proximate range-determining value for determining whether a distance of a section that is obtained by dividing the route based on the connection points is within a proximate range of a section that is immediately before or after the section;

integrating the sections that are before and after the connection point into one section if the distance is less than or equal to the proximate range-determining value; and fixing the sections that are before and after the connection point as separate sections if the section exceeds the proximate range-determining value.

2. The section setting method according to claim 1, wherein the connecting includes connecting change pattern sections, which are parts of the change patterns, sequentially from the starting point to the destination point based on the result of the comparison to optimize the fuel efficiency from the starting point to the destination point, and the setting a section includes setting, as a section used for a calculation of the optimal fuel efficiency, a section that is obtained by dividing the route at positions corresponding to connection points of the connected change pattern sections.

3. The section setting method according to claim 1, wherein the connecting includes connecting change pattern sections, which are parts of the change patterns, sequentially from the starting point to the destination point based on the result of the comparison to minimize the fuel efficiency from the starting point to the destination point, and the setting a section includes setting, as a section to be used for a calculation of the minimum fuel efficiency, a section that is obtained by dividing the route at positions corresponding to connection points of the connected change pattern sections.

4. The section setting method according to claim 1, wherein the collecting includes collecting the fuel efficiency information in fuel-efficiency-information-collecting sections, which are minimum section units for collecting the fuel efficiency information, and the comparing includes comparing the change pattern sections for each fuel-efficiency-information-collecting section.

5. The section setting method according to claim 1, wherein, in the setting of the proximate range-determining value, the proximate range-determining value is variable in accordance with a traffic environment.

6. The section setting method according to claim 1, wherein
the collecting includes acquiring the fuel efficiency information of each vehicle, and
the setting of a section includes setting the section for each vehicle.

7. A fuel efficiency information generation device configured to generate fuel-efficiency-information, which is information related to a fuel efficiency of a vehicle that travels between a starting point and a destination point, wherein
the fuel-efficiency-information generation device is configured to search routes from the starting point to the destination point, and
the fuel-efficiency-information generation device is further configured to calculate an actual fuel efficiency for each of the searched routes based on information related to a fuel efficiency obtained by connecting change pattern sections of the fuel-efficiency information for each of the sections that are set based on a section setting method comprising:
collecting fuel efficiency information with a processor, which is information related to fuel efficiency of a vehicle that travels along a single path from the starting point to the destination point and is obtained under a plurality of types of vehicle operations together with location information of the vehicle at each time;
forming a plurality of change patterns, wherein each change pattern contains the collected fuel efficiency information of the vehicle that travels along the single path from the starting point to the destination point;
comparing change patterns in the collected fuel efficiency information for each of the location information;
connecting change pattern sections, which are parts of the change patterns, sequentially from the starting point to the destination point based on a result of the comparison;
setting, as a section to be used for calculation of actual fuel efficiency, each of the sections is obtained by dividing a route at positions corresponding to connection points of the connected change pattern sections using the fuel-efficiency-information generation device,
setting a proximate range-determining value for determining whether a distance of a section that is obtained by dividing the route based on the connection points is within a proximate range of a section that is immediately before or after the section;
integrating the sections that are before and after the connection point into one section if the distance is less than or equal to the proximate range-determining value; and
fixing the sections that are before and after the connection point as separate sections if the section exceeds the proximate range-determining value.

8. The fuel-efficiency-information generation device according to claim 7, wherein the fuel-efficiency-information generation device is configured to calculate, as the actual fuel efficiency, optimal fuel-efficiency information that is information related to an optimal fuel efficiency obtained by connecting change pattern sections of the fuel-efficiency information to optimize the fuel efficiency from the starting point to the destination point, and calculate the optimal fuel efficiency for each of the searched routes based on the calculated optimal fuel-efficiency information.

9. The fuel-efficiency-information generation device according to claim 7, wherein the fuel-efficiency-information generation device is configured to calculate, as the actual fuel efficiency, minimum fuel-efficiency information that is information related to a minimum fuel efficiency obtained by connecting change pattern sections of the fuel-efficiency information to minimize the fuel efficiency from the starting point to the destination point, and calculate the minimum fuel efficiency for each of the searched routes based on the calculated minimum fuel-efficiency information.

10. The fuel-efficiency-information generation device according to claim 7, wherein
a plurality of vehicles that respectively include a radio communication function and travel in the same section are configured to transmit information to a control center of a probe information communication system,
the control center is configured to calculate the fuel-efficiency information based on the transmitted information, and
the fuel-efficiency-information generation device is configured to request the control center of the information related to the actual fuel efficiency.

11. A drive assist device that assists driving of a driver by providing fuel-efficiency information, which is information related to a fuel efficiency of a vehicle that travels between a starting point and a destination point, wherein
the drive assist device is configured to search routes from the starting point to the destination point, and
the drive assist device is further configured to provide information related to an actual fuel efficiency for each of the searched routes based on the information related to a fuel efficiency obtained by connecting change pattern sections of the fuel-efficiency information for each of the sections that are set based on a section setting method comprising:
collecting fuel efficiency information with a processor, which is information related to fuel efficiency of a vehicle that travels along a single path from the starting point to the destination point and is obtained under a plurality of types of vehicle operations together with location information of the vehicle at each time;
forming a plurality of change patterns, wherein each change pattern contains the collected fuel efficiency information of the vehicle that travels along the single path from the starting point to the destination point;
comparing change patterns in the collected fuel efficiency information for each of the location information;
connecting change pattern sections, which are parts of the change patterns, sequentially from the starting point to the destination point based on a result of the comparison;
setting, as a section to be used for calculation of actual fuel efficiency, each of the sections is obtained by dividing a route at positions corresponding to connection points of the connected change pattern sections using a fuel-efficiency-information generation device,
setting a proximate range-determining value for determining whether a distance of a section that is obtained by dividing the route based on the connection points is within a proximate range of a section that is immediately before or after the section;

integrating the sections that are before and after the connection point into one section if the distance is less than or equal to the proximate range-determining value; and fixing the sections that are before and after the connection point as separate sections if the section exceeds the proximate range-determining value.

12. The drive assist device according to claim 11, wherein the drive assist device is configured to calculate, as the actual fuel efficiency, optimal fuel-efficiency information that is information related to an optimal fuel efficiency obtained by connecting change pattern sections of the fuel-efficiency information to optimize the fuel efficiency from the starting point to the destination point, and calculate the optimal fuel efficiency for each of the searched routes based on the calculated optimal fuel-efficiency information.

13. The drive assist device according to claim 11, wherein the drive assist device is configured to calculate, as the actual fuel efficiency, minimum fuel-efficiency information that is information related to a minimum fuel efficiency obtained by connecting change pattern sections of the fuel-efficiency information to minimize the fuel efficiency from the starting point to the destination point, and calculate the minimum fuel efficiency for each of the searched routes based on the calculated minimum fuel-efficiency information.

14. The drive assist device according to claim 11, wherein the fuel-efficiency information includes vehicle operation information as information related to a vehicle operation that have been performed when the fuel-efficiency information is acquired, and as one form of the drive assistance, the drive assist device is configured to provide the driver with the vehicle operation information included in the respective change pattern sections that configure the information related to the actual fuel efficiency to the driver.

15. The drive assist device according to claim 14, wherein the drive assist device is configured to generate the vehicle operation information to be provided to the driver based on comparing the vehicle operation information included in the respective change pattern sections that configure the information related to the actual fuel efficiency with information related to a vehicle operation of the device mounting vehicle for each of the searched route.

16. The drive assist device according to claim 11, further comprising a display device that displays the fuel-efficiency information, wherein the drive assist device is configured to cause the display device to display the information related to the actual fuel efficiency for each of the searched routes that have been searched from a current location to the destination point.

17. The drive assist device according to claim 11, further comprising a control center of a probe information communication system, wherein the control center is configured to calculate the fuel-efficiency information based on information transmitted via radio communication from a plurality of vehicles travelling in the same section, and the control center is configured to provide, in response to a request, the information related to the actual fuel efficiency among the calculated fuel-efficiency information.

\* \* \* \* \*